United States Patent
Bodoc et al.

(10) Patent No.: US 11,466,101 B2
(45) Date of Patent: Oct. 11, 2022

(54) SELF-INVERTIBLE INVERSE LATEX COMPRISING ALKYL POLYGLYCOSIDES AS AN INVERTING AGENT AND USE THEREOF AS A THICKENING AGENT FOR A DETERGENT OR CLEANING FORMULATION FOR INDUSTRIAL OR DOMESTIC USE

(71) Applicant: SOCIETE D'EXPLOITATION DE PRODUITS POUR LES INDUSTRIES CHIMIQUES SEPPIC, Paris (FR)

(72) Inventors: Miruna Bodoc, Paris (FR); Georges Dacosta, Saix (FR); Jérôme Guilbot, Castres (FR); Aurélie Pierre, Paris (FR)

(73) Assignee: SOCIETE D'EXPLOITATION DE PRODUITS POUR LES INDUSTRIES CHIMIQUES SEPPIC, Paris (FR)

( * ) Notice: Subject to any disclaimer, the term of this patent is extended or adjusted under 35 U.S.C. 154(b) by 213 days.

(21) Appl. No.: 16/766,081

(22) PCT Filed: Nov. 16, 2018

(86) PCT No.: PCT/FR2018/052885
§ 371 (c)(1),
(2) Date: May 21, 2020

(87) PCT Pub. No.: WO2019/102115
PCT Pub. Date: May 31, 2019

(65) Prior Publication Data
US 2020/0354655 A1 Nov. 12, 2020

(30) Foreign Application Priority Data
Nov. 21, 2017 (FR) ..................... 1760985

(51) Int. Cl.
C11D 3/22 (2006.01)
C11D 3/37 (2006.01)
C08F 2/30 (2006.01)
C08F 2/32 (2006.01)
C08F 220/06 (2006.01)
C11D 1/66 (2006.01)
C11D 3/00 (2006.01)
C11D 3/20 (2006.01)
C11D 3/34 (2006.01)
C11D 11/00 (2006.01)
C11D 17/00 (2006.01)
C08F 220/58 (2006.01)

(52) U.S. Cl.
CPC ............ *C08F 2/30* (2013.01); *C08F 220/585* (2020.02); *C11D 1/662* (2013.01); *C11D 3/0042* (2013.01); *C11D 3/2065* (2013.01); *C11D 3/349* (2013.01); *C11D 3/378* (2013.01); *C11D 11/0023* (2013.01); *C11D 17/0021* (2013.01)

(58) Field of Classification Search
CPC ..... C11D 1/662; C11D 3/2006; C11D 3/2065; C11D 3/22; C11D 3/222; C11D 3/37; C11D 3/3746; C11D 3/3765; C11D 3/378; C11D 17/0017; C08F 2/30; C08F 2/32; C08F 220/06; C08F 220/585; C08F 222/385
See application file for complete search history.

(56) References Cited

U.S. PATENT DOCUMENTS

| | | |
|---|---|---|
| 3,598,865 A | 8/1971 | Lew |
| 6,488,946 B1 | 12/2002 | Mililus et al. |
| 6,673,861 B2 | 1/2004 | Tabacchi et al. |
| 2001/0051686 A1 | 12/2001 | Tabacchi et al. |
| 2001/0053801 A1 | 12/2001 | Tabacchi et al. |
| 2002/0032243 A1 | 3/2002 | Tabacchi et al. |
| 2016/0015609 A1* | 1/2016 | Merat ................. C08F 2/24 424/59 |
| 2021/0007962 A1* | 1/2021 | Bodoc ................. A61K 8/8158 |
| 2021/0378938 A1* | 12/2021 | Bodoc ................. A61K 8/8188 |

FOREIGN PATENT DOCUMENTS

| | | |
|---|---|---|
| EP | 0 939 670 | 9/1999 |
| EP | 1 055 451 | 11/2000 |
| EP | 1 173 273 | 1/2002 |
| FR | 2 756 195 | 5/1998 |
| FR | 2 790 977 | 9/2000 |
| FR | 2 794 034 | 12/2000 |
| FR | 2 794 124 | 12/2000 |
| FR | 2 808 446 | 11/2001 |
| FR | 2 808 447 | 11/2001 |
| FR | 2 810 883 | 1/2002 |
| WO | WO 2016/020622 | 2/2016 |

OTHER PUBLICATIONS

International Search Report, PCT/FR2018/052885, dated Feb. 11, 2019.
French Search Report FR1760985, dated May 29, 2018.

* cited by examiner

*Primary Examiner* — Brian P Mruk
(74) *Attorney, Agent, or Firm* — Nixon & Vanderhye

(57) ABSTRACT

Self-invertible inverse latex including as an inverting agent for surfactant species of the alkylpolyglycoside family, the alkyl chain of which includes from 8 to 18 carbon atoms, and use thereof as thickener and/or emulsifier and/or stabilizer for a detergent or cleaning formulation for industrial or household use.

20 Claims, No Drawings

SELF-INVERTIBLE INVERSE LATEX COMPRISING ALKYL POLYGLYCOSIDES AS AN INVERTING AGENT AND USE THEREOF AS A THICKENING AGENT FOR A DETERGENT OR CLEANING FORMULATION FOR INDUSTRIAL OR DOMESTIC USE

BACKGROUND OF THE INVENTION

Field of the Invention

The invention relates to self-invertible inverse latices comprising as inverting agent a surfactant composition comprising alkylpolyglycosides, to the use of said self-invertible inverse latices as thickeners used for preparing detergent or cleaning formulations for industrial or household use, and also to these formulations. For the purposes of the present patent application, the expression "detergent or cleaning formulations for industrial or household use" means compositions designed and used for the cleaning of various types of surfaces, for instance textile fibers, hard surfaces of various natures, for instance glass, ceramic, tiles, wood, metal or composite materials.

Description of the Related Art

These detergent or cleaning formulations for industrial or household use are used, for example, for cleaning kitchenware, bottles or laundry, whether manually or in washing machines, floors, metal surfaces, windows or storage tanks. They are either alkaline or acidic. Alkaline formulations are generally used for removing greasy soiling from hard surfaces, whereas acidic formulations are used not only for removing soiling but also for descaling said surfaces. They are particularly suitable for cleaning and descaling facilities of the agri-food industry, or for descaling household electrical equipment, such as dishwashers and coffee machines. They are also used for removing concrete or cement residues, and for the cleaning of concrete surfaces that are ingrained with grease, before any painting of said concrete surfaces.

Acidic detergent formulations should not cause substantial formation of during the cleaning operation in the presence of the soiling to be treated, they to have good wetting and detergent properties.

Detergent or cleaning formulations for industrial or household use are powders of concentrates, liquids such as emulsions, and, depending on the case, are used directly or after dilution in a suitable solvent.

In liquid form, such as emulsions, they include rheology modifiers during their manufacture.

These rheology modifiers are preferably thickeners and/or gelling agents, the purpose of which is to thicken the aqueous phase or the emulsion comprising the detergent surfactants, so as to enable the user to control the flow thereof, for example by means of a circulation pump, and also to be able to suspend and/or stabilize solid particles. Among the rheology modifiers that may be used for the preparation of detergent or cleaning formulations for industrial or household use, mention may be made of synthetic polymers, for instance linear or branched, crosslinked or noncrosslinked anionic, or cationic, or ampholytic polyelectrolytes, which are in two physical forms, powder form and liquid form.

The international patent application published under the number WO 2016/020622 A1 describes the use, for manufacturing a detergent liquid aqueous composition for household or industrial use, of a branched or crosslinked polymer obtained by polymerization of an aqueous solution of one or more monomers in inverse emulsion of water-in-oil type, with at least one of the monomers used being an acrylic monomer and one or more of the monomers used being a monomer bearing at least one weak acid function, the molar percentage of monomers bearing at least one weak acid function relative to the total amount of monomers used being at least 30%.

In processes for preparing self-invertible inverse latices via the use of inverse emulsion radical polymerization, the surfactants of oil-in-water type are added on conclusion of the polymerization step. The purpose of their addition is to modify and adjust the hydrophilic-lipophilic balance of the water-in-oil emulsion comprising the polymer (also known as an "inverse latex") so as to obtain a mixture which, once added to a polar phase, for instance water, will change emulsion direction to pass from the water-in-oil form to the oil-in-water form, then making it possible to place the polymer prepared previously in contact with the polar phase to be thickened. During such a physical phenomenon, the polymer of crosslinked and/or branched polyelectrolyte type is deployed in said polar phase and forms a three-dimensional network allowing the polar phase to swell, which is manifested by an increase in the viscosity of this polar phase.

The mixture comprising the "inverse latex" and the surfactant of oil-in-water type is known as a self-invertible inverse latex and said surfactant of oil-in-water type is known as an "inverter" or "inverting agent".

The inverting agents commonly used for the preparation of self-invertible inverse latices are surfactants of oil-in-water type which have an HLB (hydrophilic-lipophilic balance) value that is high enough to make it possible to prepare stable emulsions of oil-in-water type, generally greater than 9 and less than 16. They generally comprise a hydrophilic part consisting of a sequence of ethylene oxide units and a part consisting of a hydrocarbon-based aliphatic chain of hydrophobic nature. Among these inverting agents, mention may be made of:

ethoxylated fatty alcohols, the hydrocarbon-based aliphatic chain of which comprises from 8 to 14 carbon atoms and the number of ethylene oxide units of which is between 5 and 40, for example lauryl alcohol ethoxylated with 7 mol of ethylene oxide (INCI name: Laureth-7) or tridecyl alcohol with 6 mol of ethylene oxide (INCI name: Trideceth-6);

ethoxylated sorbitan esters, the hydrocarbon-based aliphatic chain of which comprises from 12 to 22 carbon atoms and the number of ethylene oxide units of which is between 5 and 40, for example sorbitan oleate ethoxylated with 20 mol of ethylene oxide, sold under the trade name Montanox™80, or sorbitan laurate ethoxylated with 20 mol of ethylene oxide, sold under the trade name Montanox™20;

ethoxylated alkylphenols, for example ethoxylated nonylphenols and ethoxylated octylphenols; or ethoxylated castor oils, for example castor oil ethoxylated with 40 mol of ethylene oxide, sold under the brand name Simulsol™ OL 50.

The changes in consumer demands and in the regulatory provisions have led designers of products for household and industrial detergency to reduce the proportion of ingredients including ethylene oxide units in their formulations. There is thus a need to prepare self-invertible inverse latices which are free of ethoxylated surfactants as inverting agents.

The French patent applications published under the numbers 2 794 034, 2 794 124, 2 808 447, 2 808 446 and 2 810 883 describe the use of alkylpolyglycosides, the hydrocarbon-based alkyl chain of which includes from 1 to 30 carbon atoms, for example mixtures of alkylpolyglucosides whose hydrocarbon-based alkyl chains are decyl, dodecyl and tetradecyl chains, for instance the mixture sold under the brand name Simulsol™ SL 10, dodecyl, tetradecyl and hexadecyl chains, for instance the mixture sold under the brand name Simulsol™ SL 26, octyl and decyl chains, for instance the mixture sold under the brand name Simulsol™ SL 8, or the undecylenyl chain, for instance the mixture sold under the brand name Simulsol™ SL 11 W.

However, the implementation of such compounds for preparing self-invertible inverse latices must be performed at a temperature above their melting point, i.e. generally at a temperature above 70° C., which poses problems of destabilization of the inverse latex and entails a certain amount of destabilization of the self-invertible inverse latex prepared. In certain cases it is performed by prediluting said alkylpolyglycosides in water to have a liquid form that is manipulable at room temperature. This occasionally has the consequence of reducing the rate of inversion of said self-invertible inverse latices in the polar phases to be thickened, and thus of reducing the productivity of processes for preparing cosmetic formulations comprising such thickeners.

SUMMARY OF THE INVENTION

There thus remains a need to develop a surfactant system of oil-in-water type, the constituent surfactants of which are in satisfactory compliance with the environmental standards in force notably by being free of alkylene oxide units (for instance ethylene oxide units), and which make it possible to prepare self-invertible inverse latices that can readily be used and notably that can be pumped at 25° C., which have a viscosity of less than or equal to 8000 mPa·s, preferably less than or equal to 5000 mPa·s, the viscosity being measured at 25° C. using a Brookfield RVT viscometer and a No. 3 spindle at a spinning speed of 20 rpm, which have a smooth appearance, free of grains or lumps, and which have good inversion properties in polar phases, i.e. which induce a rapid rate of inversion, of less than 15 minutes, preferably less than 10 minutes, enabling the polymer included in the self-invertible inverse latex to express its full thickening capacity.

According to a first aspect, a subject of the invention is an emulsion of water-in-oil type (E) comprising, per 100% of its mass:

a)—from 10% by mass to 80% by mass of a crosslinked polymer (P) derived from the polymerization, per 100 mol %:

($a_1$)—of a proportion of greater than or equal to 30 mol % and less than or equal to 100 mol %, of monomer units derived from a monomer bearing a strong acid function, which is partially or totally salified; and ($a_2$)—optionally of a proportion of greater than 0 mol % and less than or equal to 70%, of monomer units derived from at least one monomer chosen from the elements of the group consisting of acrylic acid, methacrylic acid, itaconic acid, maleic acid, 3-methyl-1-[(1-oxo-2-propenyl)amino]butanoic acid, the carboxylic function of said monomers being in acid form, which are partially or totally salified, and/or from the elements of the group consisting of (2-hydroxyethyl) acrylate, (2,3-dihydroxypropyl) acrylate, (2-hydroxyethyl) methacrylate, (2,3-dihydroxypropyl) methacrylate or vinylpyrrolidone;

($a_3$)—of a proportion of greater than 0 mol % and less than or equal to 1 mol %, of monomer units derived from at least one diethylenic or polyethylenic crosslinking monomer (AR);

it being understood that the sum of the molar proportions of the monomer units ($a_1$), ($a_2$) and ($a_3$) is equal to 100%;

b)—from 5% by mass to 50% by mass, more particularly from 5% by mass to 45% by mass and even more particularly from 5% by mass to 40% by mass of a fatty phase consisting of at least one oil (H), and c)—from 1% by mass to 50% by mass, more particularly from 5% by mass to 45% by mass and even more particularly from 5% by mass to 40% by mass of water, and d)—from 0.5% by mass to 10% by mass, more particularly from 0.5% by mass to 8% by mass and even more particularly from 0.5% by mass to 7% by mass of an emulsifying system ($S_1$) of water-in-oil type, and e)—from 2% by mass to 10% by mass, more particularly from 2% by mass to 8% by mass and even more particularly from 4% by mass to 7% by mass of an emulsifying system ($S_2$) of oil-in-water type comprising, per 100% of its mass, at least 50% by mass of a composition ($C_e$) comprising, per 100% of its mass:

$e_1$)—A proportion of greater than or equal to 20% by mass and less than or equal to 80% by mass of a diluent of formula (I):

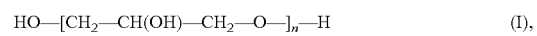
$$HO\text{---}[CH_2\text{---}CH(OH)\text{---}CH_2\text{---}O\text{---}]_n\text{---}H \qquad (I),$$

in which n is an integer greater than or equal to 1 and less than or equal to 6, or a mixture of said diluents;

$e_2$)—A proportion of greater than or equal to 20% by mass and less than or equal to 80% by mass of a composition ($C_{e2}$) comprising, per 100% of its mass:

$e_{2\alpha}$)—A proportion of greater than 0% and less than or equal to 4% by mass of at least one alcohol of formula (II):

$$C_mH_{2m+1}\text{---}OH \qquad (II),$$

in which m is an even integer greater than or equal to 8 and less than or equal to 18;

$e_{2\beta}$)—A proportion of greater than or equal to 96% by mass and less than 100% by mass of a composition ($C_{2\beta}$) comprising:

$e_{2\beta2}$)—A proportion of greater than or equal to 60% by mass and less than or equal to 90% by mass of a composition ($C_{2\beta2}$) comprising, per 100% of its mass:

$e_{2\beta21}$)—A proportion of greater than or equal to 5% by mass and less than or equal to 20% by mass of a composition ($C_{21}$) represented by formula (III):

$$R_{21}\text{---}O\text{-}(G_{21})_r\text{-}H \qquad (II),$$

in which $R_{21}$ represents an n-dodecyl radical, $G_{21}$ represents a reducing sugar residue and r represents a decimal number greater than or equal to 1.05 and less than or equal to 5.00, said composition ($C_{21}$) consisting of a mixture of the compounds of formulae ($III_1$), ($III_2$), ($III_3$), ($III_4$) and ($III_5$):

$$R_{21}\text{---}O\text{-}(G_{21})_1\text{-}H \qquad (III_1),$$

$$R_{21}\text{---}O\text{-}(G_{21})_2\text{-}H \qquad (III_2),$$

$$R_{21}\text{---}O\text{-}(G_{21})_3\text{-}H \qquad (III_3),$$

$$R_{21}\text{---}O\text{-}(G_{21})_4\text{-}H \qquad (III_4),$$

$$R_{21}\text{---}O\text{-}(G_{21})_5\text{-}H \qquad (III_5),$$

in molar proportions of said compounds of formulae $(III_1)$, $(III_2)$, $(III_3)$, $(III_4)$ and $(III_5)$ respectively equal to $a_1$, $a_2$, $a_3$, $a_4$ and $a_5$, such that the sum $a_1+a_2+a_3+a_4+a_5$ is equal to 1, and such that the sum $a_1+2a_2+3a_3+4a_4+5a_5$ is equal to r;

$e_{2\beta 22}$)—A proportion of greater than or equal to 10% by mass and less than or equal to 20% by mass of a composition $(C_{22})$ represented by formula (IV):

$$R_{22}\!-\!O\!-\!(G_{22})_s\!-\!H \qquad (IV),$$

in which $R_{22}$ represents an n-tetradecyl radical, $G_{22}$ represents a reducing sugar residue and s represents a decimal number greater than or equal to 1.05 and less than or equal to 5.00, said composition $(C_{22})$ consisting of a mixture of the compounds of formulae $(IV_1)$, $(IV_2)$, $(IV_3)$, $(IV_4)$ and $(IV_5)$:

$$R_{22}\!-\!O\!-\!(G_{22})_1\!-\!H \qquad (IV_1),$$

$$R_{22}\!-\!O\!-\!(G_{22})_2\!-\!H \qquad (IV_2),$$

$$R_{22}\!-\!O\!-\!(G_2)_3\!-\!H \qquad (IV_3),$$

$$R_{22}\!-\!O\!-\!(G_{22})_4\!-\!H \qquad (IV_4),$$

$$R_{22}\!-\!O\!-\!(G_{22})_5\!-\!H \qquad (IV_5),$$

in molar proportions of said compounds of formulae $(IV_1)$, $(IV_2)$, $(IV_3)$, $(IV_4)$ and $(IV_5)$ respectively equal to $b_1$, $b_2$, $b_3$, $b_4$ and $b_5$, such that the sum $b_1+b_2+b_3+b_4+b_5$ is equal to 1, and such that the sum $b_1+2b_2+3b_3+4b_4+5b_5$ is equal to s;

$e_{2\beta 23}$)—A proportion of greater than or equal to 25% by mass and less than or equal to 40% by mass of a composition $(C_{23})$ represented by formula (V):

$$R_{23}\!-\!O\!-\!(G_{23})_t\!-\!H \qquad (V),$$

in which $R_{23}$ represents an n-octyl radical, $G_{23}$ represents a reducing sugar residue and t represents a decimal number greater than or equal to 1.05 and less than or equal to 5.00, said composition $(C_{23})$ consisting of a mixture of the compounds of formulae $(V_1)$, $(V_2)$, $(V_3)$, $(V_4)$ and $(V_5)$:

$$R_{23}\!-\!O\!-\!(G_{23})_1\!-\!H \qquad (V_1),$$

$$R_{23}\!-\!O\!-\!(G_{23})_2\!-\!H \qquad (V_2),$$

$$R_{23}\!-\!O\!-\!(G_{23})_3\!-\!H \qquad (V_3),$$

$$R_{23}\!-\!O\!-\!(G_3)_4\!-\!H \qquad (V_4),$$

$$R_{23}\!-\!O\!-\!(G_{23})_5\!-\!H \qquad (V_5),$$

in molar proportions of said compounds of formulae $(V_1)$, $(V_2)$, $(V_3)$, $(V_4)$ and (V) respectively equal to $c_1$, $c_2$, $c_3$, $c_4$ and $c_5$, such that the sum $c_1+c_2+c_3+c_4+c_5$ is equal to 1, and such that the sum $c_1+2c_2+3c_3+4c_4+5c_5$ is equal to t;

$e_{2\beta 24}$)—A mass proportion of greater than or equal to 30% by mass and less than or equal to 55% by mass of a composition $(C_{24})$ represented by formula (VI):

$$R_{24}\!-\!O\!-\!(G_{24})_u\!-\!H \qquad (VI),$$

in which $R_{24}$ represents an n-decyl radical, $G_{24}$ represents a reducing sugar residue and u represents a decimal number greater than or equal to 1.05 and less than or equal to 5.00, said composition $(C_{24})$ consisting of a mixture of the compounds of formulae $(VI_1)$, $(VI_2)$, $(VI_3)$, $(VI_4)$ and $(VI_5)$:

$$R_{24}\!-\!O\!-\!(G_{24})_1\!-\!H \qquad (VI_1),$$

$$R_{24}\!-\!O\!-\!(G_{24})_2\!-\!H \qquad (VI_2),$$

$$R_{24}\!-\!O\!-\!(G_{24})_3\!-\!H \qquad (VI_3),$$

$$R_{24}\!-\!O\!-\!(G_{24})_4\!-\!H \qquad (VI_4),$$

$$R_{24}\!-\!O\!-\!(G_{24})_5\!-\!H \qquad (VI_5),$$

in molar proportions of said compounds of formulae $(VI_1)$, $(VI_2)$, $(VI_3)$, $(VI_4)$ and $(VI_5)$ respectively equal to $d_1$, $d_2$, $d_3$, $d_4$ and $d_5$, such that the sum $d_1+d_2+d_3+d_4+d_5$ is equal to 1, and such that the sum $d_1+2d_2+3d_3+4d_4+5d_5$ is equal to u; it being understood that the sum of the mass proportions of compositions $(C_{21})$, $(C_{22})$, $(C_{23})$ and $(C_{24})$ is equal to 100%;

$e_{2\beta 3}$)—A proportion of greater than or equal to 10% by mass and less than or equal to 40% by mass of a composition $(C_{2\beta 3})$ comprising, per 100% of its mass:

$e_{2\beta 31}$)—A proportion of greater than or equal to 30% by mass and less than or equal to 50% by mass of a composition $(C_{31})$ represented by formula (VII):

$$R_{31}\!-\!O\!-\!(G_{31})_x\!-\!H \qquad (VII)$$

in which $R_{31}$ represents an n-hexadecyl radical, $G_{31}$ represents a reducing sugar residue and x represents a decimal number greater than or equal to 1.05 and less than or equal to 5.00, said composition $(C_{31})$ consisting of a mixture of the compounds of formulae $(VII_1)$, $(VII_2)$, $(VII_3)$, $(VII_4)$ and $(VII_5)$:

$$R_{31}\!-\!O\!-\!(G_{31})_1\!-\!H \qquad (VII_1),$$

$$R_{31}\!-\!O\!-\!(G_{31})_2\!-\!H \qquad (VII_2),$$

$$R_{31}\!-\!O\!-\!(G_{31})_3\!-\!H \qquad (VII_3),$$

$$R_{31}\!-\!O\!-\!(G_{31})_4\!-\!H \qquad (VII_4),$$

$$R_{31}\!-\!O\!-\!(G_{31})_5\!-\!H \qquad (VII_5),$$

in molar proportions of said compounds of formulae $(VII_1)$, $(VII_2)$, $(VII_3)$, $(VII_4)$ and $(VII_5)$ respectively equal to $a'_1$, $a'_2$, $a'_3$, $a'_4$ and $a'_5$, such that the sum $a'_1+a'_2+a'_3+a'_4+a'_5$ is equal to 1, and such that the sum $a'_1+2a'_2+3a'_3+4a'_4+5a'_5$ is equal to x;

$e_{2\beta 32}$)—A proportion of greater than or equal to 50% by mass and less than or equal to 70% by mass of a composition $(C_{32})$ represented by formula (VIII):

$$R_{32}\!-\!O\!-\!(G_{32})_y\!-\!H \qquad (VIII),$$

in which $R_{32}$ represents an n-octadecyl radical, $G_{32}$ represents a reducing sugar residue and y represents a decimal number greater than or equal to 1.05 and less than or equal to 5.00, said composition $(C_{32})$ consisting of a mixture of the compounds of formulae $(VIII_1)$, $(VIII_2)$, $(VIII_3)$, $(VIII_4)$ and $(VIII_5)$:

$$R_{32}\!-\!O\!-\!(G_{32})_1\!-\!H \qquad (VIII_1),$$

$$R_{32}\!-\!O\!-\!(G_{32})_2\!-\!H \qquad (VIII_2),$$

$$R_{32}\!-\!O\!-\!(G_{32})_3\!-\!H \qquad (VIII_3),$$

$$R_{32}\!-\!O\!-\!(G_{32})_4\!-\!H \qquad (VIII_4),$$

$$R_{32}\!-\!O\!-\!(G_{32})_5\!-\!H \qquad (VIII_5),$$

in molar proportions of said compounds of formulae $(VIII_1)$, $(VIII_2)$, $(VIII_3)$, $(VIII_4)$ and $(VIII_5)$ respectively equal to $b'_1$, $b'_2$, $b'_3$, $b'_4$ and $b'_5$, such that the sum $b'_1+b'_2+b'_3+b'_4+b'_5$ is equal to 1, and such that the sum $b'_1+2b'_2+3b'_3+4b'_4+5b'_5$ is equal to y; it being understood that the sum of the mass proportions of compositions $(C_{31})$ and $(C_{32})$ is equal to 100%, and it being understood that the sum of the mass proportions of compounds (a), (b), (c), (d) and (e) is equal to 100%.

For the purposes of the present invention, the term "crosslinked polymer" denotes, for the polymer (P), a nonlinear polymer which, when added to water, is in the form of a three-dimensional network which is insoluble in water, but swellable in water, then leading to the production of a chemical gel.

For the purposes of the present invention, in the polymer (P) as defined previously, the term "salified" means that the strong acid function present in the monomer is in an anionic form associated in salt form with a cation, notably alkali metal salts, such as the sodium or potassium cations, or such as cations of nitrogenous bases such as the ammonium salt, the lysine salt or the 2-hydroxyethanammonium salt (HO—$CH_2$—$CH_2$—$NH_4^+$).

The strong acid function of the monomer including same is notably the sulfonic acid function or the phosphonic acid function. Said monomer is, for example, partially or totally salified styrenesulfonic acid or, preferably, partially or totally salified 2-methyl-2-[(1-oxo-2-propenyl)amino]-1-propanesulfonic acid.

According to a particular aspect of the present invention, the monomer bearing a strong acid function is 2-methyl-2-[(1-oxo-2-propenyl)amino]-1-propanesulfonic acid, and more particularly the sodium or ammonium salt of 2-methyl-2-[(1-oxo-2-propenyl)amino]-1-propanesulfonic acid.

According to another particular aspect of the present invention, said crosslinked polymer (P) is derived from the polymerization, per 100 mol %:

($a_1$)—of a proportion of greater than or equal to 40 mol % and less than or equal to 100 mol %, of monomer units derived from a monomer bearing a strong acid function, which is partially or totally salified, According to a first particular alternative of the present invention, said crosslinked polymer (P) is a crosslinked homopolymer of partially or totally salified 2-methyl-2-[(1-oxo-2-propenyl)amino]-1-propanesulfonic acid.

According to a second particular alternative of the present invention, said crosslinked polymer (P) is a crosslinked copolymer of partially or totally salified 2-methyl-2-[(1-oxo-2-propenyl)amino]-1-propanesulfonic acid and of at least one monomer chosen from acrylic acid, partially or totally salified methacrylic acid, (2-hydroxyethyl) acrylate, (2,3-dihydroxypropyl) acrylate, (2-hydroxyethyl) methacrylate, (2,3-dihydroxypropyl) methacrylate and vinylpyrrolidone.

According to another particular aspect of the present invention, the emulsion of water-in-oil type (E) as defined above comprises from 20% by mass to 80% by mass and more particularly from 30% by mass to 80% by mass of said polymer (P).

When said polymer (P) is a crosslinked copolymer, it is particularly derived from the polymerization, per 100 mol %, ($a_1$)—of a proportion of greater than or equal to 40 mol % and less than 100 mol %, of monomer units derived from a monomer bearing a strong acid function, which is partially or totally salified; and ($a_2$)—of a proportion of greater than 0 mol % and less than or equal to 60%, of monomer units derived from at least one monomer chosen from the elements of the group consisting of acrylic acid, methacrylic acid, itaconic acid, maleic acid, 3-methyl-3-[(1-oxo-2-propenyl)amino]butanoic acid, the carboxylic function of said monomers being in acid form, which are partially or totally salified, and/or from the elements of the group consisting of (2-hydroxyethyl) acrylate, (2,3-dihydroxypropyl) acrylate, (2-hydroxyethyl) methacrylate, (2,3-dihydroxypropyl) methacrylate or vinylpyrrolidone;

($a_3$)—of a proportion of greater than 0 mol % and less than or equal to 1 mol %, of monomer units derived from at least one diethylenic or polyethylenic crosslinking monomer;

it being understood that the sum of the molar proportions of the monomer units ($a_1$), ($a_2$) and ($a_3$) is equal to 100%.

In the definition of the emulsion of water-in-oil type (E) that is the subject of the present invention, the term "at least one diethylenic or polyethylenic crosslinking monomer" denotes a monomer notably chosen from ethylene glycol dimethacrylate, diethylene glycol diacrylate, ethylene glycol diacrylate, diallylurea, triallylamine, trimethylolpropane triacrylate, methylenebis(acrylamide) or a mixture of these compounds, diallyloxyacetic acid or a salt thereof such as sodium diallyloxyacetate, or a mixture of these compounds.

According to another particular aspect, the crosslinking monomer is chosen from ethylene glycol dimethacrylate, triallylamine, trimethylolpropane triacrylate and methylenebis(acrylamide).

According to another particular aspect, the crosslinking monomer (AR) is used in a molar proportion of less than or equal to 0.5%, more particularly less than or equal to 0.25% and most particularly less than or equal to 0.1%; it is more particularly greater than or equal to 0.005 mol %.

Examples of crosslinked polymers (P) that may be mentioned in the context of the present invention more particularly include:

a homopolymer of 2-methyl-2-[(1-oxo-2-propenyl)amino]-1-propanesulfonic acid which is partially or totally salified in sodium salt or ammonium salt form, crosslinked with triallylamine and/or methylenebis(acrylamide);

a copolymer of 2-methyl-2-[(1-oxo-2-propenyl)amino]-1-propanesulfonic acid which is partially or totally salified in sodium salt or ammonium salt form, and of (2-hydroxyethyl)acrylate, crosslinked with triallylamine and/or methylenebis(acrylamide);

a copolymer of 2-methyl-2-[(1-oxo-2-propenyl)amino]-1-propanesulfonic acid and of acrylic acid which are partially or totally salified in sodium salt or ammonium salt form, crosslinked with triallylamine and/or methylenebis(acrylamide);

a crosslinked copolymer of 2-methyl-2-[(1-oxo-2-propenyl)amino]-1-propanesulfonic acid ($\gamma$) which is partially or totally salified in sodium salt form, and of (2-hydroxyethyl)acrylate ($\delta$) in a ($\gamma$)/($\delta$) mole ratio of between 30/70 and 90/10;

a crosslinked copolymer of 2-methyl-2-[(1-oxo-2-propenyl)amino]-1-propanesulfonic acid ($\gamma$) which is partially or totally salified in sodium salt form, and of (2-hydroxyethyl)acrylate ($\delta$) in a ($\gamma$)/($\delta$) mole ratio of between 40/60 and 90/10;

a crosslinked copolymer of 2-methyl-2-[(1-oxo-2-propenyl)amino]-1-propanesulfonic acid ($\gamma$) which is partially or totally salified in sodium salt form, and of acrylic acid ($\epsilon$) which is partially or totally salified in sodium salt form, in a ($\gamma$)/($\epsilon$) mole ratio of greater than or equal to 30/70 and less than or equal to 90/10; and a crosslinked copolymer of 2-methyl-2-[(1-oxo-2-propenyl)amino]-1-propanesulfonic acid ($\gamma$) which is partially or totally salified in sodium salt form, and of acrylic acid ($\epsilon$) which is partially or totally salified in sodium salt form, in a ($\gamma$)/($\epsilon$) mole ratio of greater than or equal to 40/60 and less than or equal to 90/10.

In the definition of composition (E) that is the subject of the present invention, the term "oil" denotes the oil (H), notably:
- linear alkanes including from 11 to 19 carbon atoms;
- branched alkanes including from 7 to 40 carbon atoms, such as isododecane, isopentadecane, isohexadecane, isoheptadecane, isooctadecane, isononadecane or isoeicosane, or mixtures of certain thereof such as those mentioned below and identified by their INCI name: C7-8 isoparaffin, C8-9 isoparaffin, C9-11 isoparaffin, C9-12 isoparaffin, C9-13 isoparaffin, C9-14 isoparaffin, C9-16 isoparaffin, C10-11 isoparaffin, C10-12 isoparaffin, C10-13 isoparaffin, C11-12 isoparaffin, C11-13 isoparaffin, C11-14 isoparaffin, C12-14 isoparaffin, C12-20 isoparaffin, C13-14 isoparaffin, C13-16 isoparaffin;
- cycloalkanes optionally substituted with one or more linear or branched alkyl radicals,
- white mineral oils, such as the products sold under the following names: Marcol™52, Marcol™82, Drakeol™6VR, Eolane™130, Eolane™150;
- hemisqualane (or 2,6,10-trimethyldodecane; CAS number: 3891-98-3), squalane (or 2,6,10,15,19,23-hexamethyltetracosane), hydrogenated polyisobutene or hydrogenated polydecene;
- the fatty alcohol ethers of formula (IX):

$$Z_1-O-Z_2 \qquad (IX),$$

in which $Z_1$ and $Z_2$, which may be identical or different, represent a linear or branched alkyl radical including from 5 to 18 carbon atoms, for example dioctyl ether, didecyl ether, didodecyl ether, dodecyl octyl ether, dihexadecyl ether, (1,3-dimethylbutyl) tetradecyl ether, (1,3-dimethylbutyl) hexadecyl ether, bis(1,3-dimethylbutyl) ether or dihexyl ether;
- monoesters of fatty acids and of alcohols of formula (X):

$$R''_1-(C=O)-O-R''_2 \qquad (X),$$

in which $R''_1-(C=O)$ represents a saturated or unsaturated, linear or branched acyl radical including from 8 to 24 carbon atoms, and $R''_2$ represents, independently of $R''_1$, a saturated or unsaturated, linear or branched hydrocarbon-based chain including from 1 to 24 carbon atoms, for example methyl laurate, ethyl laurate, propyl laurate, isopropyl laurate, butyl laurate, 2-butyl laurate, hexyl laurate, methyl cocoate, ethyl cocoate, propyl cocoate, isopropyl cocoate, butyl cocoate, 2-butyl cocoate, hexyl cocoate, methyl myristate, ethyl myristate, propyl myristate, isopropyl myristate, butyl myristate, 2-butyl myristate, hexyl myristate, octyl myristate, methyl palmitate, ethyl palmitate, propyl palmitate, isopropyl palmitate, butyl palmitate, 2-butyl palmitate, hexyl palmitate, octyl palmitate, methyl oleate, ethyl oleate, propyl oleate, isopropyl oleate, butyl oleate, 2-butyl oleate, hexyl oleate, octyl oleate, methyl stearate, ethyl stearate, propyl stearate, isopropyl stearate, butyl stearate, 2-butyl stearate, hexyl stearate, octyl stearate, methyl isostearate, ethyl isostearate, propyl isostearate, isopropyl isostearate, butyl isostearate, 2-butyl isostearate, hexyl isostearate, isostearyl isostearate;
- diesters of fatty acids and of glycerol of formula (XI) and of formula (XII):

$$R''_3-(C=O)-O-CH_2-CH(OH)-CH_2-O-(C=O)-R''_4 \qquad (XI)$$

$$R''_5-(C=O)-O-CH_2-CH[O-(C=O)-R''_6]-CH_2-OH \qquad (XII),$$

in which formulae (XI) and (XII) $R''_3-(C=O)$, $R''_4-(C=O)$, $R''_5-(C=O)$ and $R''_6-(C=O)$, which may be identical or different, represent a saturated or unsaturated, linear or branched acyl group including from 8 to 24 carbon atoms;
- triesters of fatty acids and of glycerol of formula (XIII):

$$R''_7-(C=O)-O-CH_2-CH[O-(C=O)-R''_8]-CH_2-O-(C=O)-R''_9 \qquad (XII),$$

in which $R''_7-(C=O)$, $R''_8-(C=O)$ and $R''_9-(C=O)$, which may be identical or different, represent a saturated or unsaturated, linear or branched acyl group including from 8 to 24 carbon atoms.

According to another particular aspect of the present invention, said oil (H) is chosen from:
- undecane, tridecane, isododecane or isohexadecane;
- the mixtures of alkanes and of isoalkanes and of cycloalkanes sold under the names Emogreen™ L15, Emogreen™ L19, Emosmart™ L15, Emosmart™ L19, Emosmart™ V21, Isopar™ L or Isopar™ M;
- the white mineral oils sold under the names Marcol™ 52, Marcol™ 82 Drakeol™ 6VR, Eolane™130 or Eolane™150;
- hemisqualane, squalane, hydrogenated polyisobutene or hydrogenated polydecene;
- dioctyl ether or didecyl ether;
- isopropyl myristate, hexyl palmitate, octyl palmitate, isostearyl isostearate, octanoyl/decanoyl triglyceride, hexadecanoyl/octadecanoyl triglyceride, and triglycerides derived from rapeseed oil, sunflower oil, linseed oil or palm oil.

In composition (E) that is the subject of the present invention, the emulsifying system (S1) of water-in-oil type consists either of a single emulsifying surfactant or of a mixture of emulsifying surfactants, on condition that said mixture has an HLB value that is low enough to lead to the formation of emulsions of water-in-oil type. As emulsifying surfactant of water-in-oil type, examples that may be mentioned include anhydrohexitol esters of linear or branched, saturated or unsaturated aliphatic carboxylic acids, including from 12 to 22 carbon atoms, optionally substituted with one or more hydroxyl groups, and more particularly esters of anhydrohexitols chosen from anhydrosorbitols and anhydromannitols and of linear or branched, saturated or unsaturated aliphatic carboxylic acids including from 12 to 22 carbon atoms, optionally substituted with one or more hydroxyl groups.

In composition (E) that is the subject of the present invention, the emulsifying system ($S_1$) of water-in-oil type is more particularly chosen from the elements of the group consisting of sorbitan laurate, for example the product sold under the name Montane™ 20, sorbitan palmitate, for example the product sold under the name Montane™ 40, sorbitan stearate, for example the product sold under the name Montane™ 60, sorbitan oleate, for example the product sold under the name Montane™ 80, sorbitan sesquioleate, for example the product sold under the name Montane™ 85, sorbitan trioleate, for example the product sold under the name Montane™ 83, sorbitan isolaurate, sorbitan isostearate, for example the product sold under the name Montane™ 70, mannitan laurate, mannitan oleate, or a mixture of these esters; polyesters with a molecular weight of between 1000 and 3000 and derived from condensation between a poly(isobutenyl)succinic acid or the anhydride thereof, such as Hypermer™ 2296, or the mixture sold under the brand name Simaline™ IE 501A, the polyglycol polyhydroxystearates of formula (XIV):

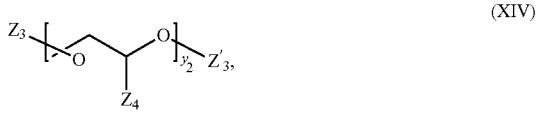

in which $y_2$ represents an integer greater than or equal to 2 and less than or equal to 50, $Z_4$ represents a hydrogen atom, a methyl radical or an ethyl radical, and $Z_3$ represents a radical of formula (XV):

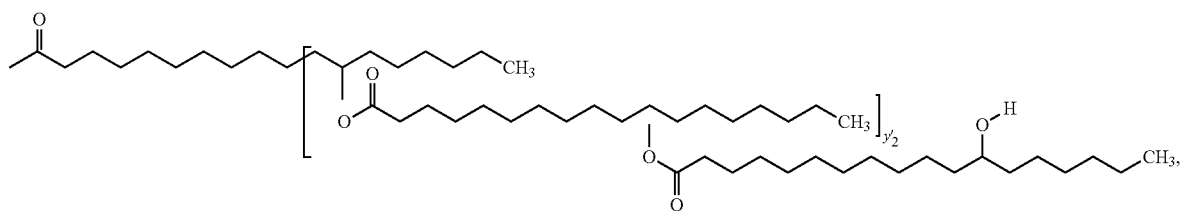

in which $y'_2$ represents an integer greater than or equal to 0 and less than or equal to 10, more particularly greater than or equal to 1 and less than or equal to 10 and $Z'_2$ represents a radical of formula (XV) as defined above, with $Z_2'$ which may be identical to or different from $Z_2$, or a hydrogen atom.

Examples of emulsifying surfactants of water-in-oil type of formula (XIV) that may be used for preparing the emulsifying system ($S_1$) include PEG-30 dipolyhydroxystearate sold under the name Simaline™ WO, or mixtures comprising PEG-30 dipolyhydroxystearate and sold under the names Simaline™ IE 201A and Simaline™ IE 201B, or the mixture comprising Trimethylolpropane-30 tripolyhydroxystearate sold under the name Simaline™ IE 301B.

According to another aspect of the present invention, said emulsifying system ($S_2$) of oil-in-water type comprises, per 100% of its mass, at least 75% by mass of said composition ($C_e$) as defined previously. According to a most particular aspect, said emulsifying system ($S_2$) of oil-in-water type is the composition ($C_e$) as defined previously.

In the definition of said emulsion of water-in-oil type (E), which is the subject of the present invention, the term "diluent of formula (I)" notably denotes glycerol, diglycerol, triglycerol or hexaglycerol.

According to another particular aspect of the present invention, said diluent is characterized in that, in formula (i), n represents an integer greater than or equal to 1 and less than or equal to 3. According to a most particular aspect, n is equal to 1, According to another particular aspect of the present invention, said emulsion of water-in-oil type (E) as defined previously is characterized in that, in formulae (III), (IV), (V), (VI), (VII) and (VIII), $G_{21}$, $G_{22}$, $G_{23}$, $G_{24}$, $G_{31}$ and $G_{32}$, which may be identical or different, represent, independently of each other, a reducing sugar residue chosen from glucose, dextrose, sucrose, fructose, idose, gulose, galactose, maltose, isomaltose, maltotriose, lactose, cellobiose, mannose, ribose, xylose, arabinose, lyxose, allose, altrose, dextran and tallose. Said reducing sugar residues $G_{21}$, $G_{22}$, $G_{23}$, $G_{24}$, $G_{31}$, and $G_{32}$, which may be identical or different, are more particularly chosen from glucose, xylose and arabinose residues.

According to a more particular aspect of the present invention, said emulsion of water-in-oil type (E) as defined previously is characterized in that, in formulae (III), (IV), (V) and (VI), said reducing sugar residues $G_{21}$, $G_{22}$, $G_{23}$ and $G_{24}$ are identical and represent a glucose residue, a xylose residue and an arabinose residue, and most particularly a glucose residue or a xylose residue.

According to a very particular aspect of the present invention, said emulsion of water-in-oil type (E) as defined previously is characterized in that, in formulae (III), (IV), (V) and (VI), said reducing sugar residues $G_{21}$, $G_{22}$, $G_{23}$ and $G_{24}$ are identical and represent a glucose residue.

According to another particular aspect of the present invention, said emulsion of water-in-oil type (E) as defined previously is characterized in that, in formulae (III), (IV), (V) and (VI), r, s, t and u, respectively, represent, independently of each other, a decimal number greater than or equal to 1.05 and less than or equal to 2.5; this decimal number is, in this case, often less than or equal to 2.0 and, for example, greater than or equal to 1.25 and less than or equal to 2.0.

According to another more particular aspect of the present invention, said emulsion of water-in-oil type (E) as defined previously is characterized in that, in formulae (VII) and (VIII), said reducing sugar residues $G_{31}$ and $G_{32}$ represent the same reducing sugar residue chosen from a glucose residue, a xylose residue and an arabinose residue, and most particularly represent a glucose residue or a xylose residue.

According to a very particular aspect of the present invention, said emulsion of water-in-oil type (E) as defined previously is characterized in that, in formulae (VII) and (VIII), said reducing sugar residues $G_{31}$ and $G_{32}$ are identical and represent a glucose residue.

According to another more particular aspect of the present invention, said emulsion of water-in-oil type (E) as defined previously is characterized in that, in formula (VII) and (VIII), x and y, respectively, represent a decimal number greater than or equal to 1.05 and less than or equal to 2.5; this decimal number is, in this case, often less than or equal to 2.0, for example greater than or equal to 1.25 and less than or equal to 2.0.

According to another particular aspect of the present invention, said emulsion of water-in-oil type (E) as defined previously is characterized in that the mass ratio:

$$\Delta = \text{mass of composition } (C_{2\beta 2})/\text{mass of composition } (C_{2\beta 3}),$$

is greater than or equal to 1 and less than or equal to 10, more particularly greater than or equal to 1.0 and less than equal to 8.0, most particularly greater than or equal to 1.5 and less than or equal to 7.0, for example greater than or equal to 2.0 and less than or equal to 7.0.

Said emulsion of water-in-oil type (E) which is the subject of the present invention is prepared by performing an "inverse emulsion polymerization" process, which is well known to those skilled in the art, and which comprises the following steps:
- a step a) of preparation of an aqueous phase comprising water, water-soluble monomers and optionally the crosslinking monomer (AR), and also additives commonly used, for instance sequestrants such as ethylenediaminetetraacetic acid in its sodium salt form, or the pentasodium salt of diethylenetriaminepentaacetic acid (sold under the brand name Versenex™ 80);
- a step b) of mixing the oily phase (H) with the emulsifying system of water-in-oil type ($S_1$);
- a step c) of mixing the aqueous phase and the oily phase, prepared during the preceding steps, and of emulsification using a spindle of rotor-stator type;
- a step d) of inertizing with nitrogen;
- a step e) of initiating the polymerization reaction by introducing into the emulsion formed in c) a free-radical initiator and optionally a coinitiator; followed by leaving the reaction to proceed;
- a step f) of introducing the emulsifying system ($S_2$) of oil-in-water type as defined previously at a temperature below 50° C.

According to a particular aspect of the process as defined previously, the polymerization reaction of step e) is initiated with a redox couple which generates hydrogen sulfite ions ($HSO_3^-$), such as the cumene hydroperoxide-sodium metabisulfite ($Na_2S_2O_5$) couple or the cumene hydroperoxide-thionyl chloride ($SOCl_2$) couple at a temperature of less than or equal to 10° C., accompanied, if desired, by a polymerization coinitiator, for instance azobis(isobutyronitrile), and is then performed either quasi-adiabatically up to a temperature of greater than or equal to 50° C., or by controlling the temperature.

According to another particular aspect of the process as defined previously, the reaction medium derived from step e) is concentrated by distillation before performing step f).

According to another particular aspect of the process as defined previously, the reaction medium derived from step e) or from step f is atomized in a suitable facility. According to another particular aspect of the process as defined previously, the aqueous phase prepared in step a) may comprise chain-reducing agents, which are intended to reduce the length of the polymer chains formed and to increase the degree of branching on the polymer, so as to modify the rheological properties.

Among the chain-reducing agents that are suitable for use in the process as defined previously, mention may be made of methanol, isopropanol, butylene glycol, 2-mercaptoethanol, thioglycolic acid and formic acid or salts thereof.

Composition ($C_e$) included in the emulsifying system ($S_2$) of oil-in-water type is prepared according to a process comprising the following steps:
- a step A) of reacting, in the desired proportions, a reducing sugar of formula (XVI) or a mixture of reducing sugars of formula (XVI):

HO-(G)-H                                       (XVI)

in which G represents the reducing sugar residue, with a molar excess of a mixture of alcohols of formula (II):

$C_mH_{2m+1}$—OH                              (II), as defined previously, to form a mixture of compounds of formulae (III), (IV), (V), (VI), (VII) and (VIII) as defined previously and an excess of said mixture of alcohols of formula (II);

- a step B) of partial removal of the excess of said mixture of alcohols of formula (II) to form said composition ($C_{e2}$) as defined previously;
- a step C) of mixing said composition ($C_{e2}$) with at least one diluent as defined previously.

Step A) is generally performed in a reactor in the presence of an acidic catalytic system, by controlling the stoichiometric ratio between the two reagents, and more particularly by introducing a molar excess of the mixture of alcohols of formula (II), with mechanical stirring under predetermined temperature and partial vacuum conditions, for example at a temperature of between 70° C. and 130° C. and under a partial vacuum of between 300 mbar ($3\times10^4$ Pa) and 20 mbar ($2\times10^3$ Pa). The term "acidic catalytic system" denotes strong acids such as sulfuric acid, hydrochloric acid, phosphoric acid, nitric acid, hypophosphorous acid, methanesulfonic acid, para-toluenesulfonic acid, trifluoromethanesulfonic acid, or ion-exchange resins.

The process as defined above may also comprise neutralization, filtration and decolorizing operations.

A subject of the invention is also the use of said emulsion of water-in-oil type (E) as defined previously, as a thickener and/or emulsifier and/or stabilizer for a detergent liquid aqueous composition for household or industrial use. b For the purposes of the present invention, the expression "detergent liquid aqueous compositions for household or industrial use" means compositions that are liquid at 20° C., which are designed and used for the cleaning of various types of surfaces, for instance textile fibers, hard surfaces of various natures, for instance glass, ceramic, tiles, wood, metal or composite materials.

These "detergent liquid aqueous compositions for household or industrial use" find their applications for cleaning soiling from said surfaces, for instance for cleaning kitchenware manually or by means of a dishwasher, bottles, laundry manually or by means of a washing machine, floors, metal surfaces soiled with grease, windows, toilets or storage tanks.

Among these detergent liquid aqueous compositions for household or industrial use intended for the detergency of hard surfaces for household or industrial applications, alkaline aqueous cleaning compositions and acidic aqueous cleaning compositions may be distinguished. Such detergent liquid aqueous compositions for household or industrial use may be in the form of a solution, a gel, an emulsion of oil-in-water type or of water-in-oil type, or in the form of a dispersion.

According to a particular aspect, said use consists in thickening polar phases, for instance phases consisting of water, alcohols comprising from 1 to 6 carbon atoms, polyols such as glycerol, or mixtures thereof.

According to another particular aspect, said use consists in stabilizing an emulsion of oil-in-water type, or of water-in-oil type, giving said emulsion a homogeneous appearance during storage under various conditions, and more particularly at 25° C. for a time at least equal to one month, and more particularly at 4° C. for a time at least equal to one month, and more particularly at 45° C. for a time at least equal to one month.

According to another particular aspect, said use consists in stabilizing solid particles in detergent liquid aqueous compositions for household or industrial use.

These solid particles to be suspended may have various regular or irregular geometries, and may be in the form of pearls, beads, rods, flakes, strips or polyhedra. These solid particles are characterized by an apparent mean diameter of between 1 μm and 5 mm, more particularly between 10 μm and 1 mm. Among the solid particles that may be suspended and stabilized by means of said emulsion of water-in-oil type (E) as defined previously in detergent liquid aqueous compositions for household or industrial use, mention may be made of mineral microparticles which improve the cleaning properties, which are included, per 100% by mass of said detergent liquid aqueous composition for household or industrial use, at between 0.2% and 20% by mass.

Among these solid particles that may be suspended and stabilized by means of said emulsion of water-in-oil type (E) as defined previously in detergent liquid aqueous compositions for household or industrial use, mention may be made of inorganic solid particles such as silica, titanium dioxide, micas, iron oxides, zinc oxide, aluminum oxide, talc, kaolin, clays, boron nitride, calcium carbonate, magnesium carbonate, magnesium hydrogen carbonate, colored inorganic pigments, solid organic particles such as certain polymers, polyamides such as nylon-6, polyethylenes, polypropylenes, polystyrenes, polyesters, acrylic or methacrylic polymers, for instance polymethyl methacrylates, polytetrafluoroethylene, crystalline or microcrystalline waxes, porous spheres, and capsules containing additives, for instance a fragrance, a soap or a laundry softener, said particles generally having a micro-particulate or nano-particulate size.

A subject of the invention is also a composition (F) for household or industrial use, comprising, per 100% of its total mass, between 0.1% and 10% by mass of composition (E) as defined above.

The expression "a composition (F) for household or industrial use" has the same meaning as that defined above.

Composition (F) for household or industrial use that is the subject of the present invention is notably in the form of an aqueous solution, an emulsion or a microemulsion with an aqueous continuous phase, and emulsion or a microemulsion with an oily continuous phase, an aqueous gel, a foam, or in the form of an aerosol.

Composition (F) for household or industrial use that is the subject of the present invention may be applied directly by soaking, by spraying or by vaporizing onto the surface to be cleaned or else by means of any type of support intended to be placed in contact with the hard surface to be cleaned (paper, wipe, textile) comprising said composition (F).

In general, composition (F) for household or industrial use that is the subject of the present invention also includes ingredients usually used in the field of cleaning hard surfaces or textile fibers, such as nonionic surfactants, cationic surfactants, amphoteric surfactants, cationic polymers, nonionic polymers, thickeners, enzymes, bleaching agents, anti-corrosion agents, solvents, acidic agents, alkaline agents, anti-limescale agents, preserving agents, fragrances, colorants, repellents, oxidizing agents, detergency adjuvants, anti-soiling agents or anti-redeposition agents.

Among the mineral acids that are particularly chosen as acidic agents in composition (F) for household or industrial use that is the subject of the present invention, mention may be made of hydrochloric acid, nitric acid, phosphoric acid, sulfuric acid, hypophosphorous acid, phosphorous acid, hypochlorous acid, perchloric acid, carbonic acid, boric acid, manganic acid, permanganic acid, chromic acid, periodic acid, iodic acid, hypoiodous acid, hydrobromic acid, hydriodic acid and hydrofluoric acid.

Among the organic acids that are particularly chosen as acidic agents in composition (F) for household or industrial use that is the subject of the present invention, mention may be made of formic acid, acetic acid, propionic acid, benzoic acid, salicylic acid, oxalic acid, malonic acid, succinic acid, glutaric acid, adipic acid, glycolic acid, lactic acid, malic acid, maleic acid, tartaric acid, citric acid, sorbic acid, sulfamic acid, dihydroacetic acid, dimethylsulfamic acid, fumaric acid, glutamic acid, isopropylsulfamic acid, valeric acid, benzenesulfonic acid, xylenesulfonic acid, 2-ethylhexanoic acid, capric acid, caproic acid, cresylic acid, dodecylbenzenesulfonic acid, peracetic acid, monochloroacetic acid and gluconic acid.

Among the alkaline agents associated with composition (F) for household or industrial use that is the subject of the present invention, mention may be made of elements from the group consisting of alkali metal or alkaline-earth metal hydroxides, for instance sodium hydroxide, potassium hydroxide, barium hydroxide and calcium hydroxide.

Among the anti-limescale agents associated with composition (F) for household or industrial use that is the subject of the present invention, mention may be made of elements from the group consisting of sequestrants, for instance sodium tripolyphosphate (TPP), ethylenediaminetetraacetate (EDTA), tetraacetylethylenediamine (TAED), methylglycine diacetate (MGDA), sodium nitrilotriacetate ($Na_3NTA$), sodium or potassium gluconate, sodium or potassium erythorbate, sodium or potassium polycarboxylate, and sodium citrate, of ion-exchange agents, for instance zeolites or sodium aluminosilicates, or lamellar sodium silicates, and precipitating agents, for instance calcium carbonate and sodium metasilicate.

The sequestrants, and more particularly the sequestrants described above, have the effect of complexing calcium and magnesium ions to form water-soluble complexes which are then removed during rinsing.

The ion-exchange agents, and more particularly the ion-exchange agents described above, have the effect of exchanging their sodium ions with calcium and magnesium ions.

The precipitating agents, and more particularly the sequestrants described above, have the effect of removing the ions responsible for the hardness of water by forming insoluble calcium compounds, which are subsequently removed with the soiling on the cleaned surfaces.

According to a more particular aspect, in composition (F) for household or industrial use that is the subject of the present invention, the anti-limescale agent is chosen from elements from the group consisting of sodium metasilicate, sodium tripolyphosphate (TPP), ethylenediaminetetraacetate (EDTA), tetraacetylethylenediamine (TAED), methylglycine diacetate (MGDA), sodium nitrilotriacetate ($Na_3NTA$), sodium gluconate, sodium citrate and calcium carbonate.

Among the nonionic surfactants that may be combined with composition (F) for household or industrial use that is the subject of the present invention, mention may be made of:

block copolymers of ethylene oxide and of propylene oxide, and most particularly the block copolymers of ethylene oxide and of propylene oxide sold under the brand name Pluronic™ by the company BASF, for instance Pluronic™ PE 6100 and Pluronic™ PE 6200, defoaming nonionic surfactants of formula ($A_1$):

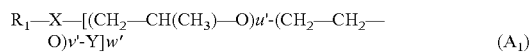

$$R_1-X-[(CH_2-CH(CH_3)-O)u'-(CH_2-CH_2-O)v'-Y]w' \quad (A_1)$$

in which:
$R_1$ represents a linear or branched, saturated or unsaturated aliphatic hydrocarbon-based radical including from 6 to 18 carbon atoms,
X represents a nitrogen atom or an oxygen atom,
v' represents an integer between 1 and 50, u' represents an integer between 1 and 50, w' represents an integer equal to 1 if X represents an oxygen atom, and w' represents an integer equal to 1 or 2 if X represents a nitrogen atom, Y represents a blocking functional group chosen from the elements from the group consisting of linear alkyl radicals including from 4 to 8 carbon atoms, for instance the butyl radical, the benzyl radical or a butylene oxide group.

Among the defoaming nonionic surfactants of formula (A$_1$), mention may be made of the products sold under the brand name Tergitol™ by the company Dow Chemical, for instance Tergitol™ L61E and Tergitol™ L64E, sparingly foaming nonionic surfactants of formula (A$_2$):

(A$_2$)

in which:

S' represents a reducing sugar residue chosen from the elements of the group consisting of glucose, xylose and arabinose, R$_8$ represents a linear or branched, saturated hydrocarbon-based radical including from 6 to 10 carbon atoms, q' represents a decimal number greater than or equal to 1.05 and less than or equal to 5.

As examples of sparingly foaming nonionic surfactants of formula (A$_2$) present in composition (F) for household or industrial use that is the subject of the present invention, mention may be made of hexyl polyglucosides, 2-ethylhexyl polyglucosides, n-heptyl polyglucosides and n-octyl polyglucosides.

Among the foaming and/or detergent amphoteric surfactants that may be combined with composition (F) for household or industrial use that is the subject of the present invention, mention may be made of alkylbetaines, alkylamidobetaines, sultaines, alkylamidoalkylsulfobetaines, imidazoline derivatives, phosphobetaines, amphopolyacetates, amphopropionates, β-alanine, and sodium N-(2-carboxyethyl)-N-(2-ethylhexyl) sold under the brand name Tomamine® Amphoteric 400 Surfactant.

Among the foaming and/or detergent anionic surfactants that may be combined with composition (F) for household or industrial use that is the subject of the present invention, mention may be made of salts of alkali metals, of alkaline-earth metals, of ammonium, of amines, of amino alcohols of alkyl ether sulfates, of alkyl sulfates, of alkylamido ether sulfates, of alkylarylpolyether sulfates, of monoglyceride sulfates, of α-olefin sulfonates, of paraffin sulfonates, of alkyl phosphates, of alkyl ether phosphates, of alkyl sulfonates, of alkylamide sulfonates, of alkylaryl sulfonates, of alkyl carboxylates, of alkylsulfosuccinates, of alkyl ether sulfosuccinates, of alkylamide sulfosuccinates, of alkyl sulfoacetates, of alkyl sarcosinates, of acylisethionates, of N-acyl taurates, of acyl lactylates, of N-acyl derivatives of amino acids, of N-acyl derivatives of peptides, of N-acyl derivatives of proteins, of N-acyl derivatives of fatty acids.

Among the nonionic surfactants that may be combined with composition (F) for household or industrial use that is the subject of the present invention, mention may be made of alkoxylated monoglycerides, alkoxylated diglycerides, alkoxylated terpenic hydrocarbons such as ethoxylated and/or propoxylated α- or β-pinenes, containing from 1 to 30 oxyethylene and/or oxypropylene units, products resulting from the condensation of ethylene oxide or of propylene oxide with ethylenediamine, such as the Tetronic™ products sold by BASF, ethoxylated and/or propoxylated C8-C18 fatty acids containing from 5 to 25 mol of ethylene oxide and/or propylene oxide, ethoxylated fatty amides containing from 5 to 30 mol of ethylene oxide, ethoxylated amines containing from 5 to 30 mol of ethylene oxide, alkoxylated amidoamines containing from 1 to 50, preferably from 1 to 25 and most particularly from 2 to 20 mol of ethylene oxide and/or of propylene oxide.

Among the thickeners and/or gelling agents that may be combined with composition (F) for household or industrial use that is the subject of the present invention, mention may be made of polysaccharides consisting only of monosaccharides, such as glucans or glucose homopolymers, glucomannoglucans, xyloglycans, galactomannans of which the degree of substitution (DS) of the D-galactose units on the main D-mannose chain is between 0 and 1, and more particularly between 1 and 0.25, such as galactomannans originating from cassia gum (DS=1/5), locust bean gum (DS=1/4), tara gum (DS=1/3), guar gum (DS=1/2) or fenugreek gum (DS=1).

Among the thickeners and/or gelling agents that may be combined with composition (F) for household or industrial use that is the subject of the present invention, mention may be made of polysaccharides consisting of monosaccharide derivatives, such as sulfated galactans and more particularly carrageenans and agar, uronans and more particularly algins, alginates and pectins, heteropolymers of monosaccharides and of uronic acids, and more particularly xanthan gum, gellan gum, gum arabic exudates and karaya gum exudates, glucosaminoglycans.

Among the thickeners and/or gelling agents that may be combined with composition (F) for household or industrial use that is the subject of the present invention, mention may be made of cellulose, cellulose derivatives such as methylcellulose, ethylcellulose, hydroxypropylcellulose, silicates, starch, hydrophilic starch derivatives, and polyurethanes.

Among the thickeners and/or gelling agents that may be combined with composition (F) for household or industrial use that is the subject of the present invention, mention may be made of inorganic thickeners, for instance clays, hectorite, saponite, sauconite, vermiculite or colloidal silica.

The thickeners present in composition (F) that is the subject of the present invention are used in amounts of between 0.1% and 10% by mass.

Among the abrasive agents that may be combined with composition (F) for household or industrial use that is the subject of the present invention, mention may be made of materials of natural origin, for instance wood or kernel chips, inorganic abrasive materials such as oxides, quartzes, diatomaceous earths, colloidal silica dioxides, organic abrasive materials such as polyolefins, for instance polyethylenes and polypropylenes, polystyrenes, acetonitrile-butadiene-styrene resins, melamines, phenolic resins, epoxy resins or polyurethane resins.

The abrasive agents present in composition (F) that is the subject of the present invention are used in amounts of between 5.0% and 30% by mass.

Among the solvents that may be combined with composition (F) for household or industrial use that is the subject of the present invention, mention may be made of isopropyl alcohol, benzyl alcohol, 1,3-propanediol, chlorinated solvents, acetone, methyl ethyl ether, methyl isobutyl ether, butyl acetate, ethyl acetate, isopropyl acetate, isobutyl acetate, aromatic solvents, isoparaffins, isododecane, ethyl lactate, butyl lactate, terpenic solvents, rapeseed methyl esters, sunflower methyl esters, propylene glycol n-methyl ether, dipropylene glycol n-methyl ether, tripropylene glycol n-methyl ether, propylene glycol n-butyl ether, dipropylene glycol n-butyl ether, tripropylene glycol n-butyl ether, propylene glycol n-propyl ether, dipropylene glycol n-propyl ether, propylene glycol monomethyl ether acetate, propylene glycol diacetate, propylene glycol phenyl ether, ethylene glycol phenyl ether or dipropylene glycol dimethyl ether.

As examples of solvents present in composition (F) that is the subject of the present invention, mention may be made more particularly of the elements from the group consisting of propylene glycol n-methyl ether, dipropylene glycol n-methyl ether, tripropylene glycol n-methyl ether, propylene glycol n-butyl ether, dipropylene glycol n-butyl ether, tripropylene glycol n-butyl ether, propylene glycol n-propyl ether, dipropylene glycol n-propyl ether, propylene glycol phenyl ether, ethylene glycol phenyl ether, dipropylene glycol dimethyl ether, rapeseed methyl esters and sunflower methyl esters. Among the enzymes that may be combined with composition (F) for household or industrial use that is the subject of the present invention, mention may be made of proteases, amylases, lipases, cellulases and peroxidases.

The enzymes present in composition (F) that is the subject of the present invention are used in amounts of between 0.005% and 0.5% by mass.

According to another aspect, a subject of the invention is the use of a composition (F) for household or industrial use as defined above, for cleaning hard surfaces.

The expression "for cleaning hard surfaces" denotes any action intended for removing soiling present on surfaces consisting of various materials. The surfaces to be cleaned may be hard surfaces or textile surfaces. The term "hard surfaces" denotes, for example, floors, walls, window panes, tiles, household electrical appliances, kitchenware, countertops, tapware, sinks, tanks for storing chemical, food or agricultural products, vehicles (motor vehicles, motorbikes, trucks, etc.).

The materials constituting these hard surfaces are, for example, glass (soda-lime, fluorocalcium, borosilicate, crystal), porcelain, earthenware, ceramic, polycarbonate or polypropylene plastics, stainless steel, silver, copper, aluminum, wood, synthetic resins, vitroceramic or linoleum, and may be coated with paints or varnishes.

As examples of soiling that is present on these hard surfaces and that is to be removed by cleaning, examples that may be mentioned include food residues, grease, light and heavy hydrocarbons, burnt residues, dust, sludge, finger marks, soap residues and microorganisms.

According to another aspect, a subject of the invention is a process for cleaning a hard surface, comprising at least one step a"$_1$) of applying composition (F) for household or industrial use as defined above to said hard surface, followed by at least one step b"$_1$) of rinsing said hard surface.

In step a"$_1$) of the cleaning process that is the subject of the invention, composition (F) for household or industrial use is applied to the surface comprising the soiling to be cleaned, by any means, for instance by total immersion, by spraying, by application by means of a support consisting of synthetic or natural, woven or nonwoven textile fibers, or paper, impregnated beforehand with said composition (F) for household or industrial use.

In step b"$_1$) of the cleaning process that is the subject of the invention, the rinsing of the hard surface onto which composition (F) for household or industrial use has been applied during step a"$_1$) is performed by total immersion or by spraying with water. Step b"$_1$) of the cleaning process that is the subject of the invention may be performed at room temperature or at a temperature of between 30° C. and 80° C., more particularly at a temperature of between 30° C. and 65° C.

DESCRIPTION OF THE PREFERRED EMBODIMENTS

The examples that follow illustrate the invention without, however, limiting it.

I$_A$—Preparation of a Composition (C$_{e2A}$) Based on Alkylpolyglucosides and Glycerol 72.5 kg (i.e. 8.5 molar equivalents) of a mixture (M$_1$) including, per 100% of its mass, 30.2% by mass of 1-octanol, 38.4% by mass of 1-decanol, 7.4% by mass of 1-dodecanol, 8.9% by mass of 1-tetradecanol, 5.1% by mass of 1-hexadecanol and 10.0% by mass of 1-octadecanol are prepared by successively introducing with stirring, at 90° C., each of the fatty alcohols mentioned previously in desired proportions.

The mixture (M$_1$) is homogenized at 90° C. for 30 minutes, followed by addition thereto of 8.7 kg (i.e. 1 molar equivalent) of glucose, and then 80 g of 98% sulfuric acid. The reaction medium is then placed under a partial vacuum of from $90 \times 10^2$ Pa (90 mbar) to $45 \times 10^2$ Pa (45 mbar), and maintained at a temperature of from 100° C. to 105° C. for 5 hours with removal of the water formed. The reaction medium is then cooled to 80° C. and neutralized by adding 76 g of 40% sodium hydroxide. The product is filtered off to remove the unreacted glucose. 72.0 kg of a medium comprising the glucoside species formed and also the unreacted fatty alcohols in stoichiometric excess are obtained. The residual alcohols present in the mixture thus obtained are then removed by treatment on a thin-film evaporator.

36.6 kg of the reaction medium thus neutralized are then introduced into a thin-film evaporator, under a reduced pressure of from $3 \times 10^2$ Pa (3 mbar) to $5 \times 10$ Pa (5 mbar) with a wall temperature of 240° C., so as to distil off the majority of the residual alcohols and to obtain 4.5 kg of a concentrate, to which 4.5 kg of glycerol are gradually added with stirring, so as to obtain 9.0 kg of the expected composition (C$_{e2a}$).

I$_B$—Preparation of a Composition (C$_{e2B}$) Based on Alkylpolyglucosides and Diglycerol The procedure of example 1 described above is reproduced, replacing the glycerol with diglycerol, in mass proportions such that they make it possible to obtain composition (C$_{e2B}$) comprising, per 100% of its mass, 50% by mass of diglycerol.

I$_C$—Preparation of a Composition (C$_{e2}$c) Based on Alkylpolyglucosides and Polyglycerol-6

The procedure of example 1 described above is reproduced, replacing the glycerol with polyglycerol-6 (sold under the brand name Polyglycerol-6™ from the company Spiga), in mass proportions such that they make it possible to obtain composition (C$_{e2C}$) comprising, per 100% of its mass, 50% by mass of polyglycerol-6.

I$_T$—Preparation of a Composition (C$_{e2T}$) Based on Alkylpolyglucosides and 1,3-Propanediol The procedure of example 1 described above is reproduced, replacing the glycerol with 1,3-propanediol (sold under the brand name Zemea™ propanediol from the company Dupont-Tate & Lyle), in mass proportions such that they make it possible to obtain composition (C$_{e2T}$) comprising, per 100% of its mass, 22% by mass of 1,3-propanediol.

II— Preparation and Evaluation of Self-Invertible Inverse Latices of a Crosslinked Copolymer of the Sodium Salt of 2-Methyl-[(1-Oxo-2-Propenyl)Amino]-1-Propanesulfonic Acid and of Partially Salified Acrylic Acid An aqueous phase is prepared by successively pouring into a beaker, with stirring, 2.77 g of deionized water, 73.1 g of glacial acrylic acid, 308 g of 2-methyl[(1-oxo-2-propenyl)amino]-1-propanesulfonic acid, 141 g of an aqueous solution containing 48% by mass of sodium hydroxide, 0.45 g of a commercial aqueous solution containing 40% by mass of sodium diethylenetriaminepentaacetate and 0.128 g of methylenebis(acrylamide). The pH of this aqueous phase is then adjusted to 5.4 and the solution is made up with deionized water to a weight of 682 g.

Independently, an organic phase is prepared by mixing 220 g of isohexadecane, 15 g of Montane™ 80, 10 g of Montane™ 70 and 0.2 g of azobis(isobutyronitrile) (AIBN).

The aqueous phase prepared is then gradually added to the oily phase and then dispersed using an Ultra-Turrax rotor-stator sold by the company IKA.

The emulsion obtained is transferred into a reactor, subjected to sparging with nitrogen to remove the oxygen, and cooled to about 5-6° C. 5 cm³ of a solution containing 0.42% by mass of cumene hydroperoxide in isohexadecane are added to the emulsion with continuous stirring, followed by gradual introduction of an aqueous solution containing 2.5% by mass of sodium metabisulfite at a flow rate of 0.5 cm³ per minute over 60 minutes to initiate the polymerization reaction. The temperature of the medium increases up to a steady stage. The reaction medium is then heated at 85° C. for 1 hour and the assembly is then cooled to about 35° C. to obtain the mixture noted as ($M_2$).

The mixture ($M_2$) obtained previously is split into several portions to which are added the various surfactant compositions (($C_{e2A}$)), ($C_{e2B}$), ($C_{e2C}$) and ($C_{e2T}$) as described above, and also Polysorbate 80 (78% by mass of active material) sold under the brand name Montanov™ 80 ($S_2$), and an aqueous solution of capryl/caprylyl polyglucosides (60% by mass of active material) sold under the brand name Simulsol™ SL8 (noted as composition $S'_2$), in mass proportions as indicated in table 1 below.

The self-invertible inverse latices resulting from these mixtures are respectively noted as ($E_1$), ($E_2$), ($E_3$), ($E_{C1}$), ($E_{C2}$) and ($E_{C3}$) and are evaluated by observation of their appearance at 25° C., their viscosity at 25° C., the rate of inversion during the preparation of an aqueous gel containing 2% by mass of self-invertible inverse latex, the viscosity of this aqueous gel containing 2% by mass of a self-invertible inverse latex and the viscosity of an aqueous gel containing 3% by mass of self-invertible inverse latex in the presence of 0.1% by mass of sodium chloride.

The method for evaluating the inversion time of the self-invertible inverse latices consists in pouring into a 1 liter beaker the required amount of water for the preparation of 800 g of an aqueous gel. A Turbotest™ mechanical stirrer impeller, connected to a motor, is placed at the bottom of the beaker. Stirring is started at a speed of 200 rpm and the required amount of self-invertible inverse latex to be evaluated is introduced into the beaker with stirring. The stirring is gradually increased so as to maintain the same height of vortex in the beaker throughout the thickening phase, until a smooth, homogeneous gel is obtained. The inversion time of the self-invertible inverse latices corresponds to the time elapsed between the start of addition of the test self-invertible inverse latex and the production of a smooth gel, free of lumps. The results obtained are given in table 1 below.

TABLE 1

| Self-invertible inverse latices | | |
|---|---|---|
| ($E_1$) | ($E_2$) | ($E_3$) |
| Mass proportion of surfactant composition tested contained in the self-invertible inverse latex | | |
| ($C_{e2A}$): 6% | ($C_{e2B}$): 6% | ($C_{e2C}$): 6% |
| Viscosity of the aqueous gels and of the self-invertible inverse latex (in mPa · s) (Brookfield RVT) | | |
| Gel containing 2% by mass of self-invertible inverse latex (spindle 6, speed 5) | | |
| 81 000 | 74 000 | 86 000 |
| Aqueous gel containing 3% by mass of self-invertible inverse latex (spindle 6, speed 5) | | |
| 124 800 | 122 000 | 130 000 |
| Aqueous gel containing 3% by mass of self-invertible inverse latex + 0.1% by mass of NaCl (spindle 6, speed 5) | | |
| 33 200 | 32 640 | 28 900 |
| Self-invertible inverse latex at 25° C. (spindle 3, speed 20) | | |
| 2330 | 1530 | 1560 |
| Inversion time (in minutes) | | |
| 2 | 6 | 6 |
| Appearance of the self-invertible inverse latex at 25° C. | | |
| Homogeneous | Homogeneous | Homogeneous |
| Self-invertible inverse latices | | |
| ($E_{C1}$) | ($E_{C2}$) | ($E_{C3}$) |
| Mass proportion of surfactant composition tested contained in the self-invertible inverse latex | | |
| ($C_{e2T}$): 5% | ($S_2$): 5% | ($S'_2$): 5% |
| Viscosity of the aqueous gels and of the self-invertible inverse latex at 25° C. (in mPa · s) (Brookfield RVT) | | |
| Gel containing 2% by mass of self-invertible inverse latex (spindle 6, speed 5) | | |
| Not measured | 67 000 | 75 200 |
| Aqueous gel containing 3% by mass of self-invertible inverse latex (spindle 6, speed 5) | | |
| Not measured | 118 000 | 120 000 |
| Aqueous gel containing 3% by mass of self-invertible inverse latex + 0.1% by mass of NaCl (spindle 6, speed 5) | | |
| Not measured | 22 400 | 22 400 |
| Self-invertible inverse latex at 25° C. (spindle 3, speed 20) | | |
| 1120 | 1450 | 1250 |
| Inversion time (in minutes) | | |
| >1440 | 2 | 3 |
| Appearance of the self-invertible inverse latex at 25° C. | | |
| Presence of grains after 24 hours; heterogeneous | Homogeneous | Presence of grains |

*nm: not measured

The self-invertible inverse latices ($E_1$), ($E_2$) and ($E_3$) according to the invention, free of alkoxylated derivatives, make it possible to obtain smooth gels, with an inversion time of less than 10 minutes, having excellent thickening properties. Furthermore, they are characterized by a smaller drop in the viscosity of a gel at 3% by mass in the presence of salt when compared notably with the self-invertible inverse latex ($E_{S'2}$).

III— Preparation and Evaluation of Self-Invertible Inverse Latices of a Homopolymer of the Sodium Salt of 2-Methyl-[(1-Oxo-2-Propenyl)Amino]-1-Propanesulfonic Acid An aqueous phase is prepared by successively pouring into a beaker, with stirring, 220 g of deionized water, 343.5 g of 2-methyl[(1-oxo-2-propenyl)amino]-1-propanesulfonic acid, 138.1 g of an aqueous solution containing 48% by mass of sodium hydroxide, 0.18 g of a commercial aqueous solution containing 40% by mass of sodium diethylenetriaminepentaacetate and 0.140 g of methylenebis(acrylamide). The pH of this aqueous phase is then adjusted to 3.5 and the solution is made up with deionized water to a weight of 707 g.

Independently, an organic phase is prepared by mixing 220 g of isohexadecane, 22 g of Montane™ 80VG and 0.2 g of AIBN.

The aqueous phase prepared is then gradually added to the oily phase and then dispersed using an Ultra-Turrax rotor-stator sold by the company IKA.

The emulsion obtained is transferred into a reactor, subjected to sparging with nitrogen to remove the oxygen, and cooled to about 5-6° C. 5 $cm^3$ of a solution containing 0.42% by mass of cumene hydroperoxide in isohexadecane are added to the emulsion with continuous stirring, followed by gradual introduction of an aqueous solution containing 2.5% by mass of sodium metabisulfite at a flow rate of 0.5 $cm^3$ per minute over 60 minutes to initiate the polymerization reaction. The temperature of the medium increases up to a steady stage. The reaction medium is maintained at this temperature for 1 hour 30 minutes and the assembly is then cooled to about 35° C. to obtain the mixture noted as ($M_3$).

The mixture ($M_3$) obtained previously is split into various portions, to which are added various surfactant compositions ($C_{e2A}$), ($S_2$) and ($S'_2$), in mass proportions as indicated in table 2 below, to obtain the self-invertible inverse latices respectively referenced ($E_4$), ($E_{C4}$) and ($E_{C5}$). They are evaluated as in the preceding section II. The results obtained are given in table 2 below.

TABLE 2

| Self-invertible inverse latices | | |
| --- | --- | --- |
| ($E_4$) | ($E_{c4}$) | ($E_{C5}$) |
| Mass proportion of surfactant composition tested contained in the self-invertible inverse latex | | |
| ($C_{e2A}$): 5% | ($S_2$): 5% | ($S'_2$): 5% |
| Viscosity of the aqueous gels and of the self-invertible inverse latex at 25° C. (in mPa · s) (Brookfield RVT) | | |
| Gel containing 2% by mass of self-invertible inverse latex (spindle 6, speed 5) | | |
| 117 000 | 103 000 | Not measured |
| Gel containing 3% by mass of self-invertible inverse latex + 0.1% by mass of NaCl (spindle 6, speed 5) mPa · s | | |
| 6500 | 6320 | Not measured |
| Self-invertible inverse latex at 25° C. (spindle 3, speed 20) | | |
| 2660 | 1935 | Not measured |
| Inversion time in minutes | | |
| 4 | 3 | Not measured |
| Appearance of the self-invertible inverse latex at 25° C. | | |
| Homogeneous latex | Homogeneous latex | Viscous, granular, heterogeneous latex |

The self-invertible inverse latex ($E_4$) according to the invention, free of alkoxylated, and more particularly ethoxylated, derivatives, makes it possible to obtain a smooth gel, with an inversion time of less than 10 minutes, having excellent thickening properties.

IV— Preparation and Evaluation of an Inverse Latex Comprising a Crosslinked Copolymer of the Sodium Salt of 2-Methyl-[(1-Oxo-2-Propenyl)Amino]-1-Propanesulfonic Acid and of (2-Hydroxyethyl) Acrylate An aqueous phase is prepared by successively pouring into a beaker, with stirring, 20.4 g of (2-hydroxyethyl) acrylate, 660 g of a commercial aqueous solution containing 55% by mass of sodium 2-methyl[(1-oxo-2-propenyl) amino]-1-propanesulfonate, 0.45 g of a commercial aqueous solution containing 40% by mass of sodium diethylenetriaminepentaacetate and 0.123 g of methylenebis(acrylamide). The pH of this aqueous phase is then adjusted to 4.0 by adding 0.55 g of 2-methyl[(1-oxo-2-propenyl)amino]-1-propanesulfonic acid.

Independently, an organic phase is prepared by mixing 265 g of squalane, 17.76 g of Montane™ 80 VG, 9.24 g of Montanox™ 81 VG and 0.2 g of azobis(isobutyronitrile) (AIBN).

The aqueous phase prepared is then gradually added to the oily phase and then dispersed using an Ultra-Turrax rotor-stator sold by the company IKA.

The emulsion obtained is transferred into a reactor, subjected to sparging with nitrogen to remove the oxygen, and cooled to about 5-6° C. 10 $cm^3$ of a solution containing 0.28% by mass of cumene hydroperoxide in squalane are added to the emulsion with continuous stirring, followed by gradual introduction of an aqueous solution containing 2.5% by mass of sodium metabisulfite at a flow rate of 0.5 $cm^3$ per minute over 60 minutes to initiate the polymerization reaction, while allowing the temperature to rise to 75° C. The reaction medium is then maintained at this temperature for about 60 minutes, after which time the mixture obtained is cooled to about 35. The assembly is cooled to a temperature of about 35° C. ($M_4$).

The mixture ($M_4$) obtained previously is split into various portions, to which are added the various surfactant compositions ($C_{e2A}$), ($S_2$) and ($S'_2$), in mass proportions as indicated in table 3 below.

The self-invertible inverse latices resulting from these mixtures are respectively noted ($E_5$), ($E_{C6}$) and ($E_{C7}$). They are evaluated as in the preceding section II. The results obtained are given in table 3 below:

TABLE 3

| Self-invertible inverse latices | | |
| --- | --- | --- |
| ($E_5$) | ($E_{c6}$) | ($E_{C7}$) |
| Mass proportion of surfactant composition tested contained in the self-invertible inverse latex | | |
| ($C_{e2A}$): 3% | ($S_2$): 3% | ($S'_2$): 3% |
| Viscosity of the aqueous gels and of the self-invertible inverse latex at 25° C. (in mPa · s) (Brookfield RVT) | | |
| Gel containing 3% by mass of self-invertible inverse latex (spindle 6, speed 5) | | |
| 99 600 | 105 400 | 98 000 |
| Gel containing 3% by mass of self-invertible inverse latex + 0.1% by mass of NaCl (spindle 6, speed 5) mPa · s | | |
| 9900 | 30 540 | 2830 |

TABLE 3-continued

Self-invertible inverse latex (spindle 3, speed 20)

| 2050 | 1800 | 2100 |
|------|------|------|

Inversion time in minutes

| 6 | 3 | 3 |
|---|---|---|

Appearance of the self-invertible inverse latex at 25° C.

| Homogeneous latex | Homogeneous latex | Viscous, granular, heterogeneous latex |
|---|---|---|

The self-invertible inverse latex ($E_5$) according to the invention, free of alkoxylated, and more particularly ethoxylated, derivatives, makes it possible to obtain a smooth gel, with an inversion time of less than 10 minutes, having excellent thickening properties.

V— Preparation of an Inverse Latex Comprising a Crosslinked Copolymer of the Sodium Salt of 2-Methyl-[(1-Oxo-2-Propenyl)Amino]-1-Propanesulfonic Acid and of Acrylamide An aqueous phase is prepared by successively pouring into a beaker, with stirring, 80 g of deionized water, 253.8 g of a commercial aqueous solution containing 50% by mass of acrylamide, 246.7 g of 2-methyl[(1-oxo-2-propenyl) amino]-1-propanesulfonic acid, 95.96 g of an aqueous solution containing 48% by mass of sodium hydroxide, 0.45 g of a commercial solution containing 40% by weight of sodium diethylenetriaminepentaacetate and 0.115 g of methylenebis (acrylamide). The pH of this aqueous phase is then adjusted to 5.5 and the solution is made up with deionized water to a weight of 682 g.

Independently, an organic phase is prepared by mixing 220 g of isohexadecane, 21 g of Montane™ 80 VG and 0.2 g of azobis(isobutyronitrile) (AIBN).

The aqueous phase prepared is then gradually added to the oily phase and then dispersed using an Ultra-Turrax rotor-stator sold by the company IKA.

The emulsion obtained is transferred into a reactor, subjected to sparging with nitrogen to remove the oxygen, and cooled to about 5-6° C. 5 cm³ of a solution containing 0.28% by mass of cumene hydroperoxide in hexadecane are added to the emulsion with continuous stirring, followed by gradual introduction of an aqueous solution containing 2.5% by mass of sodium metabisulfite at a flow rate of 0.5 cm³ per minute over 60 minutes to initiate the polymerization reaction, while allowing the temperature to rise to 75° C. The reaction medium is then maintained at this temperature for about 60 minutes, after which time the mixture obtained is cooled to about 35° C. The assembly is cooled to a temperature of about 35° C. ($M_5$).

The mixture ($M_4$) obtained previously is split into various portions, to which are added various mass proportions of the surfactant composition ($C_{e2A}$), as indicated in table 4 below.

The self-invertible inverse latices resulting from these mixtures are respectively noted ($E_{C8}$) and ($E_{C9}$). They are evaluated as in the preceding section II. The results obtained are given in table 4 below:

TABLE 5

| Self-invertible inverse latices | |
|---|---|
| ($E_{c8}$) | ($E_{C9}$) |
| Mass proportion of surfactant composition tested contained in the self-invertible inverse latex | |
| ($C_{e2A}$): 5% | ($C_{e2A}$): 5.5% |
| Viscosity of the aqueous gels and of the self-invertible inverse latex at 25° C. (in mPa · s) (Brookfield RVT) | |
| Gel containing 3% by mass of self-invertible inverse latex (spindle 6, speed 5) | |
| 159 000 | 163 000 |
| Gel containing 3% by mass of self-invertible inverse latex + 0.1% by mass of NaCl (spindle 6, speed 5) mPa · s | |
| 16 480 | 15 400 |
| Self-invertible inverse latex (spindle 3, speed 20) | |
| Not measured | Not measurable |
| Inversion time in minutes | |
| 90 | 8 |
| Appearance of the self-invertible inverse latex at 25° C. | |
| Homogeneous, viscous latex | Viscous, heterogeneous, runny latex |

The self-invertible inverse latices ($E_{c8}$) and ($E_{c9}$), free of alkoxylated derivatives, do not make it possible to obtain a smooth gel with an inversion time of less than 10 minutes and having a homogeneous appearance.

VI: Illustrative Formulations

In the formulations below, the percentages are expressed as mass percentages per 100% of the mass of the formulation.

VI$_A$— Cleaning Composition for Ovens and Cooking Grills

| Ingredients | Mass content |
|---|---|
| Simulsol ™OX1309L[1] | 2% |
| Simulsol ™SL7G[2] | 2% |
| Composition ($E_1$) | 6% |
| Sodium hydroxide: | 25% |
| Water: | qs 100% |

[1]Simulsol ™ OX1309L: detergent surfactant composition sold by the company SEPPIC, comprising polyethoxylated alcohols resulting from the reaction of 1 molar equivalent of an alcohol sold under the brand name Exxal ™13 with 9 molar equivalents of ethylene oxide.
[2]Simulsol ™SL7G: solution of n-heptyl polyglucosides, hydrotropic and solubilizing agent sold by the company SEPPIC Preparation a) A pre-gel is prepared at 20° C. by adding Simulsol™ OX1309L and then Simulsol™ SL7G in water. Composition ($E_1$) according to the invention is then introduced into the aqueous solution and mixed until a gel of stable viscosity is obtained.

b) Sodium hydroxide is then gradually introduced with mechanical stirring at a temperature of 20° C. until a homogeneous gel is obtained.

The gel obtained on conclusion of step b) is of homogeneous and clear appearance, with a viscosity of 10 000 mPa·s (Brookfield LVT at a speed of 6 rpm). After a period of storage of 6 months at 25° C., the gel obtained on conclusion of step b) of this procedure is of homogeneous and clear appearance, with a viscosity of 12 000 mPa·s (Brookfield LVT at a speed of 6 rpm).

Cleaning Process

The composition prepared above is sprayed at room temperature onto the walls of an oven soiled with food grease and onto the cooking grills also soiled with food grease. After 10 minutes, the walls of the oven and of the cooking grills are rinsed with hot water at 60° C. The walls of the oven and the surfaces of the cooking grills thus cleaned no longer have any soiling.

$V_B$— Cleaning Agent for Aluminum Surfaces

| Ingredients | Mass content |
|---|---|
| Simulsol ™OX1309L | 3% |
| Simulsol ™SL7G | 3% |
| Composition ($E_1$) | 5% |
| 75% phosphoric acid | 40% |
| Hordaphos[(3)] MDGB 1% | 5% |
| Dipropylene glycol methyl ether | 5%| |
| Water: | qs 100% |

[(3)]Hordaphos ™ MDGB is a composition based on phosphoric esters, used as anticorrosion agent.

Preparation

Each ingredient is successively introduced into a mixing tank with moderate mechanical stirring, at room temperature, until a homogeneous, clear composition is obtained. Stirring is maintained for 30 minutes at 20° C. The composition obtained has a measured pH value of less than 1.0 and is clear and homogeneous after storage for a period of one month at 40° C.

Cleaning Process

The composition prepared in the preceding paragraph is diluted to 3% in water and the solution thus obtained is sprayed onto the aluminum wall to be cleaned. This wall is then rinsed with hot water at 60° C.

The invention claimed is:

1. An emulsion of water-in-oil (E) comprising, per 100% of its mass:
   a)—from 10% by mass to 80% by mass of a crosslinked polymer (P) derived from the polymerization, per 100 mol %:
      (a1)—of a proportion of greater than or equal to 30 mol % and less than or equal to 100 mol %, of monomer units derived from a monomer bearing a strong acid function, which is partially or totally salified; and
      (a2)—optionally of a proportion of greater than 0 mol % and less than or equal to 70%, of monomer units derived from at least one monomer chosen from the elements of the group consisting of acrylic acid, methacrylic acid, itaconic acid, maleic acid, 3-methyl-3-[(1-oxo-2-propenyl)amino]butanoic acid, the carboxylic function of said monomers being in acid form, which are partially or totally salified, and/or from the elements of the group consisting of (2-hydroxyethyl) acrylate, (2,3-dihydroxypropyl) acrylate, (2-hydroxyethyl) methacrylate, (2,3-dihydroxypropyl) methacrylate or vinylpyrrolidone;
      (a3)—of a proportion of greater than 0 mol % and less than or equal to 1 mol % of monomer units derived from at least one diethylenic or polyethylenic crosslinking monomer (AR); wherein the sum of the molar proportions of the monomer units (a1), (a2) and (a3) is equal to 100%;
   b)—from 5% by mass to 50% by mass of a fatty phase constituted of at least one oil (H); and
   c)—from 1% by mass to 50% by mass of water;
   d)—from 0.5% by mass to 10% by mass of an emulsifying system of water-in-oil (S1); and
   e)—from 2% by mass to 10% by mass of an emulsifying system (S2) of oil-in-water comprising, per 100% of its mass, at least 50% by mass of a composition (Ce) comprising, per 100% of its mass:
      e1)—A proportion of greater than or equal to 20% by mass and less than or equal to 80% by mass of a diluent of formula (I):

$$HO-[CH_2-CH(OH)-CH_2-O-]_n-H \quad (I),$$

in which n is an integer greater than or equal to 1 and less than or equal to 6, or a mixture of said diluents;
      e2)—A proportion of greater than or equal to 20% by mass and less than or equal to 80% by mass of a composition (Ce2) comprising, per 100% of its mass:
      e2α)—A proportion of greater than 0% and less than or equal to 4% by mass of at least one alcohol of formula (II):

$$C_mH_{2m+1}-OH \quad (II),$$

in which m is an even integer greater than or equal to 8 and less than or equal to 18;
      e2β)—A proportion of greater than or equal to 96% by mass and less than 100% by mass of a composition (C2β) comprising:
         e2β2)—A proportion of greater than or equal to 60% by mass and less than or equal to 90% by mass of a composition (C2β2) comprising, per 100% of its mass:
            e2β21)—A proportion of greater than or equal to 5% by mass and less than or equal to 20% by mass of a composition (C21) represented by formula (III):

$$R21-O-(G21)_r-H \quad (III),$$

in which R21 represents an n-dodecyl radical, G21 represents a reducing sugar residue and r represents a decimal number greater than or equal to 1.05 and less than or equal to 5.00, said composition (C21) consisting of a mixture of the compounds of formulae (III1), (III2), (III3), (III4) and (III5):

$$R21-O-(G21)1-H \quad (III1),$$

$$R21-O-(G21)2-H \quad (III2),$$

$$R21-O-(G21)3-H \quad (III3),$$

$$R21-O-(G21)4-H \quad (III4),$$

$$R21-O-(G21)5-H \quad (III5),$$

in molar proportions of said compounds of formulae (III1), (III2), (III3), (III4) and (III5) respectively equal to a1, a2, a3, a4 and a5, such that the sum a1+a2+a3+a4+a5 is equal to 1, and such that the sum a1+2a2+3a3+4a4+5a5 is equal to r;
            e2β22)—A proportion of greater than or equal to 10% by mass and less than or equal to 20% by mass of a composition (C22) represented by formula (IV):

$$R22-O-(G22)_s-H \quad (IV),$$

in which R22 represents an n-tetradecyl radical, G22 represents a reducing sugar residue and s represents a decimal number greater than or equal to 1.05 and less than or equal to 5.00, said composition (C22) consisting of a mixture of the compounds of formulae (IV1), (IV2), (IV3), (IV4) and (IV5):

$$R22-O-(G22)1-H \quad (IV1),$$

$$R22-O-(G22)2-H \quad (IV2),$$

$$R22-O-(G22)3-H \quad (IV3),$$

$$R22-O-(G22)4-H \quad (IV4),$$

$$R22-O-(G22)5-H \quad (IV5),$$

in molar proportions of said compounds of formulae (IV1), (IV2), (IV3), (IV4) and (IV5) respectively equal to b1, b2, b3, b4 and b5, such that the sum b1+b2+b3+b4+b5 is equal to 1, and such that the sum b1+2b2+3b3+4b4+5b5 is equal to s;

e2β23)—A proportion of greater than or equal to 25% by mass and less than or equal to 40% by mass of a composition (C23) represented by formula (V):

R23-O-(G23)$t$-H  (V), in which R23 represents an n-octyl radical, G23 represents a reducing sugar residue and t represents a decimal number greater than or equal to 1.05 and less than or equal to 5.00, said composition (C23) consisting of a mixture of the compounds of formulae (V1), (V2), (V3), (V4) and (V5):

R23-O-(G23)1-H  (V1),

R23-O-(G23)2-H  (V2),

R23-O-(G23)3-H  (V3),

R23-O-(G23)4-H  (V4),

R23-O-(G23)5-H  (V5), in molar proportions of said compounds of formulae (V1), (V2), (V3), (V4) and (V5) respectively equal to c1, c2, c3, c4 and c5, such that the sum c1+c2+c3+c4+c5 is equal to 1, and such that the sum c1+2c2+3c3+4c4+5c5 is equal to t;

e2β24)—A mass proportion of greater than or equal to 30% by mass and less than or equal to 55% by mass of a composition (C24) represented by formula (VI):

R24-O-(G24)$u$-H  (VI), in which R24 represents an n-decyl radical, G24 represents a reducing sugar residue and u represents a decimal number greater than or equal to 1.05 and less than or equal to 5.00, said composition (C24) consisting of a mixture of the compounds of formulae (VI1), (VI2), (VI3), (VI4) and (VI5):

R24-O-(G24)1-H  (VI1),

R24-O-(G24)2-H  (VI2),

R24-O-(G24)3-H  (VI3),

R24-O-(G24)4-H  (VI4),

R24-O-(G24)5-H  (VI5), in molar proportions of said compounds of formulae (VI1), (VI2), (VI3), (VI4) and (VI5) respectively equal to d1, d2, d3, d4 and d5, such that the sum d1+d2+d3+d4+d5 is equal to 1, and such that the sum d1+2d2+3d3+4d4+5d5 is equal to u; it being understood that the sum of the mass proportions of compositions (C21), (C22), (C23) and (C24) is equal to 100%;

e2β3)—A proportion of greater than or equal to 10% by mass and less than or equal to 40% by mass of a composition (C2β3) comprising, per 100% of its mass:

e2β31)—A proportion of greater than or equal to 30% by mass and less than or equal to 50% by mass of a composition (C31) represented by formula (VII):

R31-O-(G31)$x$-H  (VII)

in which R31 represents an n-hexadecyl radical, G31 represents a reducing sugar residue and x represents a decimal number greater than or equal to 1.05 and less than or equal to 5.00, said composition (C31) consisting of a mixture of the compounds of formulae (VII1), (VII2), (VII3), (VII4) and (VII15):

R31-O-(G31)1-H  (VII1),

R31-O-(G31)2-H  (VII2),

R31-O-(G31)3-H  (VII3),

R31-O-(G31)4-H  (VII4),

R31-O-(G31)5-H  (VII5), in molar proportions of said compounds of formulae (VII1), (VI12), (VI13), (VII4) and (VI15) respectively equal to a'1, a'2, a'3, a'4 and a'5, such that the sum a'1+a'2+a'3+a'4+a'5 is equal to 1, and such that the sum a'1+2a'2+3a'3+4a'4+5a'5 is equal to x;

e2β32)—A proportion of greater than or equal to 50% by mass and less than or equal to 70% by mass of a composition (C32) represented by formula (VIII):

R32-O-(G32)$y$-H  (VIII), in which R32 represents an n-octadecyl radical, G32 represents a reducing sugar residue and y represents a decimal number greater than or equal to 1.05 and less than or equal to 5.00, said composition (C32) consisting of a mixture of the compounds of formulae (VIII1), (VIII2), (VIII3), (VIII4) and (VIII5):

R32-O-(G32)1-H  (VIII1),

R32-O-(G32)2-H  (VIII2),

R32-O-(G32)3-H  (VIII3),

R32-O-(G32)4-H  (VIII4),

R32-O-(G32)5-H  (VIII5), in molar proportions of said compounds of formulae (VIII1), (VIII2), (VIII3), (VIII4) and (VI115) respectively equal to b'1, b'2, b'3, b'4 and b'5, such that the sum b'1+b'2+b'3+b'4+b'5 is equal to 1, and such that the sum b'1+2b'2+3b'3+4b'4+5b'5 is equal to y; it being understood that the sum of the mass proportions of compositions (C31) and (C32) is equal to 100%; and it being understood that the sum of the mass proportions of compounds (a), (b), (c), (d) and (e) is equal to 100%.

2. The emulsion of water-in-oil-type (E) as defined in claim 1, in which the polymer (P) is chosen from:
- a homopolymer of 2-methyl-2-[(1-oxo-2-propenyl)amino]-1-prop anesulfonic acid which is partially or totally salified in sodium salt or ammonium salt form, crosslinked with triallylamine and/or methylenebis(acrylamide);
- a copolymer of 2-methyl-2-[(1-oxo-2-propenyl)amino]-1-propanesulfonic acid which is partially or totally salified in sodium salt or ammonium salt form, and of (2-hydroxyethyl)acrylate, crosslinked with triallylamine and/or methylenebis(acrylamide);
- a copolymer of 2-methyl-2-[(1-oxo-2-propenyl)amino]-1-propanesulfonic acid and of acrylic acid which are partially or totally salified in sodium salt or ammonium salt form, crosslinked with triallylamine and/or methylenebis(acrylamide);
- a crosslinked copolymer of 2-methyl-2-[(1-oxo-2-propenyl)amino]-1-propanesulfonic acid (γ) which is partially or totally salified in sodium salt form, and of (2-hydroxyethyl)acrylate (δ) in a (γ)/(δ) mole ratio of between 30/70 and 90/10; and a crosslinked copolymer of 2-methyl-2-[(1-oxo-2-propenyl)amino]-1-propanesulfonic acid (γ) which is partially or totally salified in sodium salt form, and of acrylic acid (ε) which is partially or totally salified in sodium salt form, in a (γ)/(ε) mole ratio of greater than or equal to 30/70 and less than or equal to 90/10.

3. The emulsion of water-in-oil (B) as defined in claim 1, wherein the diluent of formula (I) is glycerol.

4. The emulsion of water-in-oil (B) as defined in claim 1, wherein, in formulae (III), (IV), (V) and (VI), said reducing sugar residues G21, G22, G23 and G24 are identical and represent a glucose residue.

5. The emulsion of water-in-oil (B) as defined in claim 1, wherein, in formulae (III), (IV), (V) and (VI), r, s, t and u respectively represent, independently of each other, a decimal number greater than or equal to 1.05 and less than or equal to 2.5.

6. The emulsion of water-in-oil (B) as defined in claim 1, wherein, in formulae (VII) and (VIII), said reducing sugar residues G31 and G32 are identical and represent a glucose residue.

7. The emulsion of water-in-oil (B) as defined in claim 1, wherein, in formulae (VII) and (VIII), x and y respectively represent a decimal number greater than or equal to 1.05 and less than or equal to 2.5.

8. The emulsion of water-in-oil (E) as defined in claim 1, wherein the mass ratio:

$$\Delta = \text{mass of composition (C2β2)/mass of composition (C2β3)},$$

is greater than or equal to 1.5 and less than or equal to 7.

9. A thickener and/or emulsifier and/or stabilizer for a detergent liquid aqueous composition for household or industrial use, comprising the emulsion of water-in-oil (E) as defined in claim 1.

10. A detergent liquid aqueous composition (F) for household or industrial use, comprising as thickener, per 100% of total mass, between 0.1% and 10% by mass of the emulsion of water-in-oil (E) as defined in claim 1.

11. A process for cleaning a hard surface, comprising:
at least one step a"1) of applying the detergent liquid aqueous composition (F) for household or industrial use as defined in claim 10,
at least one step b"1) of rinsing said hard surface.

12. The emulsion of water-in-oil (E) as defined in claim 2, wherein the diluent of formula (I) is glycerol.

13. The emulsion of water-in-oil (B) as defined in claim 2, wherein, in formulae (III), (IV), (V) and (VI), said reducing sugar residues G21, G22, G23 and G24 are identical and represent a glucose residue.

14. The emulsion of water-in-oil (B) as defined in claim 3, wherein, in formulae (III), (IV), (V) and (VI), said reducing sugar residues G21, G22, G23 and G24 are identical and represent a glucose residue.

15. The emulsion of water-in-oil (B) as defined in claim 2, wherein, in formulae (III), (IV), (V) and (VI), r, s, t and u respectively represent, independently of each other, a decimal number greater than or equal to 1.05 and less than or equal to 2.5.

16. The emulsion of water-in-oil (B) as defined in claim 3, wherein, in formulae (III), (IV), (V) and (VI), r, s, t and u respectively represent, independently of each other, a decimal number greater than or equal to 1.05 and less than or equal to 2.5.

17. The emulsion of water-in-oil (B) as defined in claim 4, wherein, in formulae (III), (IV), (V) and (VI), r, s, t and u respectively represent, independently of each other, a decimal number greater than or equal to 1.05 and less than or equal to 2.5.

18. The emulsion of water-in-oil (E) as defined in claim 2, wherein, in formulae (VII) and (VIII), said reducing sugar residues G31 and G32 are identical and represent a glucose residue.

19. The emulsion of water-in-oil (E) as defined in claim 3, wherein, in formulae (VII) and (VIII), said reducing sugar residues G31 and G32 are identical and represent a glucose residue.

20. The emulsion of water-in-oil (B) as defined in claim 4, wherein, in formulae (VII) and (VIII), said reducing sugar residues G31 and G32 are identical and represent a glucose residue.

* * * * *